(12) United States Patent
Magnotta et al.

(10) Patent No.: US 8,312,117 B1
(45) Date of Patent: Nov. 13, 2012

(54) DIALOG RECOVERY IN A DISTRIBUTED COMPUTER SYSTEM

(75) Inventors: Margaret Ann Magnotta, West Chester, PA (US); Anthony Narisi, Glenmoore, PA (US); Lois Bridgham Coyne, Lansdale, PA (US); Michelle Marie Salvado, Exton, PA (US); Susan Mary Jennion, Chester Springs, PA (US); Sarah K. Inforzato, Downingtown, PA (US)

(73) Assignee: Unisys Corporation, Blue Bell, PA (US)

(*) Notice: Subject to any disclaimer, the term of this patent is extended or adjusted under 35 U.S.C. 154(b) by 144 days.

(21) Appl. No.: 10/000,674

(22) Filed: Nov. 15, 2001

(51) Int. Cl.
*G06F 15/173* (2006.01)

(52) U.S. Cl. ........ 709/223; 709/201; 709/213; 709/218; 709/219

(58) Field of Classification Search .......... 709/201–203, 709/213, 217–219, 200, 208, 223
See application file for complete search history.

(56) References Cited

U.S. PATENT DOCUMENTS

| | | | |
|---|---|---|---|
| 3,400,372 A | 9/1968 | Beausoleil et al. | 340/172.5 |
| 4,155,117 A | 5/1979 | Mitchell et al. | 364/200 |
| 4,414,620 A | 11/1983 | Tsuchimoto et al. | 364/200 |
| 5,093,780 A | 3/1992 | Sunahara | 395/800 |
| 5,117,486 A | 5/1992 | Clark et al. | 395/250 |
| 5,247,616 A | 9/1993 | Berggren et al. | 395/200 |
| 5,321,817 A | 6/1994 | Feinstein | 395/325 |
| 5,379,296 A | 1/1995 | Johnson et al. | 370/60 |
| 5,381,534 A | 1/1995 | Shi | 395/200 |
| 5,459,836 A | 10/1995 | Whittaker et al. | 395/200.07 |
| 5,561,806 A | 10/1996 | Fitchette et al. | 395/800 |
| 5,581,709 A | 12/1996 | Ito et al. | 395/200.15 |
| 5,581,741 A | 12/1996 | Clark et al. | 395/500 |
| 5,612,953 A | 3/1997 | Olnowich | 370/367 |
| 5,634,015 A | 5/1997 | Chang et al. | 395/309 |
| 5,648,965 A | 7/1997 | Thadani et al. | 370/241 |
| 5,655,140 A | 8/1997 | Haddock | 395/200 |
| 5,669,002 A | 9/1997 | Buch | 395/726 |
| 5,701,423 A | 12/1997 | Crozier | 395/335 |
| 5,961,605 A | 10/1999 | Deng et al. | |
| 6,144,999 A * | 11/2000 | Khalidi et al. | 709/219 |
| 6,163,856 A * | 12/2000 | Dion et al. | 714/4 |
| 6,233,619 B1 | 5/2001 | Narisi et al. | 709/230 |
| 6,424,626 B1 * | 7/2002 | Kidambi et al. | 370/236 |
| 6,490,698 B1 * | 12/2002 | Horvitz et al. | 714/46 |
| 6,826,707 B1 * | 11/2004 | Stevens | 714/2 |

(Continued)

FOREIGN PATENT DOCUMENTS

EP 0 836 300 A2 4/1998

(Continued)

OTHER PUBLICATIONS

PCT Search Report dated May 9, 2003.

*Primary Examiner* — Saleh Najjar
*Assistant Examiner* — Faruk Hamza
(74) *Attorney, Agent, or Firm* — Richard J. Gregson

(57) ABSTRACT

A distributed computer system comprises an enterprise server and a network server. The distributed computer system utilizes a distributed transmission control protocol (TCP) to establish an off-loaded dialog through the network server. If the off-loaded dialog is interrupted by, e.g., failure of the hosting network server, dialog recovery is performed to move the off-loaded dialog.

24 Claims, 32 Drawing Sheets

U.S. PATENT DOCUMENTS

| | | | |
|---|---|---|---|
| 6,934,875 B2 * | 8/2005 | Kashyap | 714/4 |
| 6,938,071 B1 * | 8/2005 | Gaither et al. | 709/213 |
| 6,976,076 B2 * | 12/2005 | Shrader et al. | 709/228 |
| 7,114,096 B2 * | 9/2006 | Freimuth et al. | 714/13 |
| 2001/0014097 A1 * | 8/2001 | Beck et al. | 370/401 |
| 2004/0199808 A1 * | 10/2004 | Freimuth et al. | 714/4 |
| 2004/0205124 A1 * | 10/2004 | Limprecht et al. | 709/204 |

FOREIGN PATENT DOCUMENTS

| | | |
|---|---|---|
| WO | WO 97/01944 | 1/1997 |
| WO | WO 98/56150 | 12/1998 |
| WO | WO 00/62502 A | 10/2000 |

* cited by examiner

TCP/IP stack 10

*Prior Art*

*Prior Art*

FIG. 4

*Prior Art* socket
30 source TCP port
source IP address destination TCP port
destination IP address

Off-Loaded Data Path

FIG. 10

TCB 304
- socket 306
- other routing information 307
- additional data 308

Reception

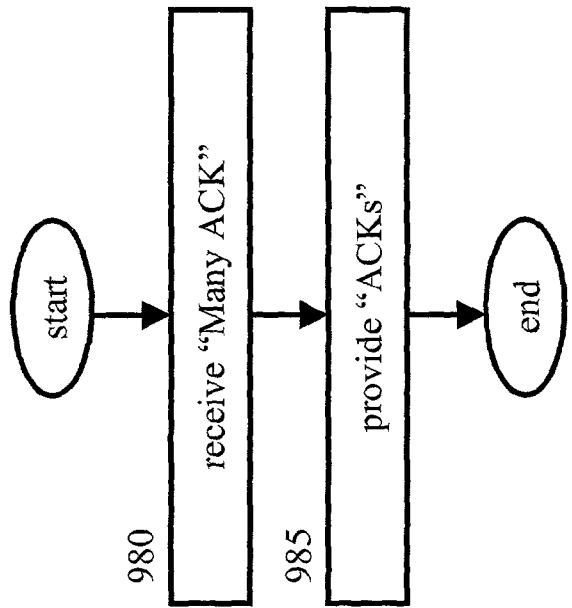
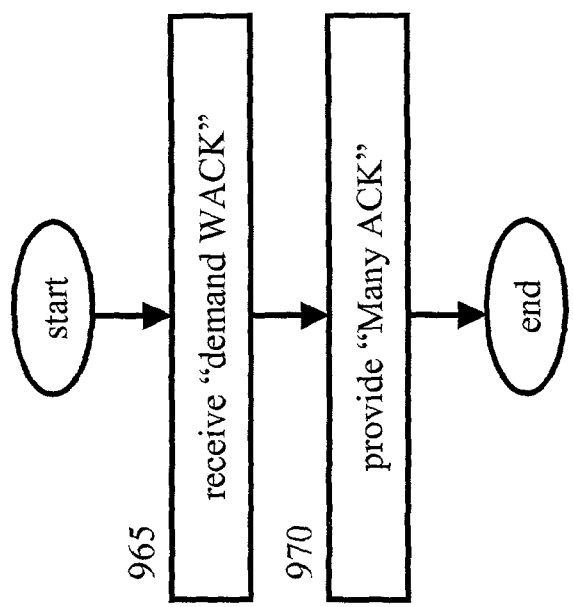
FIG. 31

DIALOG RECOVERY IN A DISTRIBUTED COMPUTER SYSTEM

CROSS-REFERENCE TO RELATED APPLICATIONS

This application is related to U.S. patent application Ser. Nos. 09/999,550, entitled "Management of Routing Information in a Distributed Computer System;" No. 10/000,698, entitled "Acknowledgement Mechanism in a Distributed Computer System;" and No. 09/999,727, entitled "Input Accumulation in a Distributed Computer System;" all filed on even date herewith and assigned to the same assignee as the present application.

This application is also related to U.S. patent application Ser. Nos. 09/418,083, filed Oct. 14, 1999; and 09/310,543, filed Jul. 31, 1998 (now U.S. Pat. No. 6,233,619, issued May 15, 2001); all assigned to the same assignee as the present application.

FIELD OF THE INVENTION

This invention relates generally to information technology (IT) and, more particularly, to application platforms/servers in a networking environment.

BACKGROUND OF THE INVENTION

An applications platform can be constructed from a number of computing environments in which at least one computing environment is different from the others. Such an applications platform is also referred to as a "heterogeneous" platform. One such example is illustrated in U.S. Pat. No. 6,233,619 issued May 15, 2001 to Narisi et al., entitled "Virtual Transport Layer Interface and Messaging Subsystem for High-Speed Communications Between Heterogeneous Computer Systems" and assigned to the same assignee as the present application. In this patent, the heterogeneous application platform is illustrated by a Unisys ClearPath HMP® enterprise server coupled with a Microsoft Windows NT® server for network services. (Also, see U.S. patent application Ser. No. 09/418,083, filed Oct. 14, 1999, assigned to the same assignee as the present application, and entitled "A Distributed Transport Communications Manager with Messaging Subsystem for High-Speed Communications between Heterogeneous Computer Systems.")

Networking of applications typically involves the use of a network protocol suite such as the popular Transmission Control Protocol/Internet Protocol (TCP/IP) stack. In the above-mentioned patent, a local application (running in the enterprise environment) can use either a TCP/IP stack in the enterprise environment or a TCP/IP stack in the NT environment to communicate with a remote application.

SUMMARY OF THE INVENTION

While the above-described heterogeneous application platform presents some benefits with respect to the ability to utilize the TCP/IP stack in either computing environment, we have observed that the heterogeneous application platform can be further improved.

In accordance with the invention, a distributed computer system comprises an enterprise server and a network server wherein a dialog is established using the network server; and wherein the enterprise server performs dialog recovery by moving the dialog upon the occurrence of a predefined condition.

In an embodiment of the invention, a distributed computer system comprises an enterprise server and at least two network servers. The distributed computer system utilizes distributed TCP communications to establish an off-loaded dialog through one of the network servers. If the off-loaded dialog is interrupted by, e.g., failure of the hosting network server, dialog recovery is performed to move the off-loaded dialog to the other network server or to a legacy TCP/IP stack in the enterprise server.

BRIEF DESCRIPTION OF THE DRAWING

FIG. 4 illustrates a socket;
FIG. 10 shows an illustrative TCP control block;
FIGS. 26-32 show illustrative flow charts for performing accumulated acknowledgements for off-loaded dialogs.

DETAILED DESCRIPTION

The inventive concept is implemented using conventional programming techniques (including those required to network applications), which will not be described herein. As such, familiarity with networking (e.g., TCP/IP, etc.) and server platform architectures (e.g., application programming interfaces (API)s, etc.) is assumed. As used herein, the term "computer program product" represents any mechanism for storing a computer program, e.g., a floppy diskette; a CD-ROM; a file, or files, in compressed and/or uncompressed form; etc. The term "machine" refers to any stored-program-control processor-based equipment (e.g., the below-described heterogeneous platform, or even a network server). Also, as can be observed from below, data is described as being conveyed in packets. However, the terms "datagram" or "frame" are also used in the art, e.g., the IP layer provides "datagrams." For the purposes of this description, the terms "packet," "datagram" and "frame" are used interchangeably, with the distinction being whether it is a TCP packet, IP packet, input accumulation block, etc.

Before describing the inventive concept, some background information is provided on TCP/IP. For readers familiar with TCP/IP, simply skip ahead to the section entitled "Off-loaded Data Path."

TCP/IP

The description below is with respect to a TCP/IP stack in a "local machine" communicating with a "remote machine." Obviously, these are relative terms, and the description equally applies to the TCP/IP stack in the remote machine.

Figure 1:
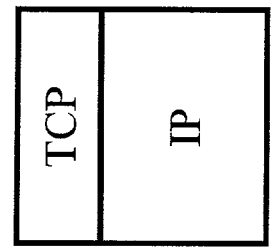
FIG. 1 illustrates a prior art TCP/IP stack.

When a local application, on a local machine, communicates with a remote application, on a remote machine, one popular protocol suite to use is TCP/IP. FIG. 1 shows an illustrative TCP/IP stack 10 for use in a local machine, which comprises a TCP portion and an IP portion. (It should also be noted that further processing (not shown) occurs below TCP/IP stack 10 at the device level or OSI physical layer, e.g., the partitioning of IP packets into Ethernet packets for transmission over a local area network (LAN).)

The TCP portion provides some connection management functions such as opening and closing connections/dialogs between applications, sending acknowledgements to verify delivery of data, window adjustments, segmentation, and end-to-end error recovery (such as retransmission of data apparently lost, error detection, etc.). (The TCP portion can also be viewed as providing the transport layer function as defined within the Open Systems Interconnection (OSI) reference model as known in the art.)

Figure 2:
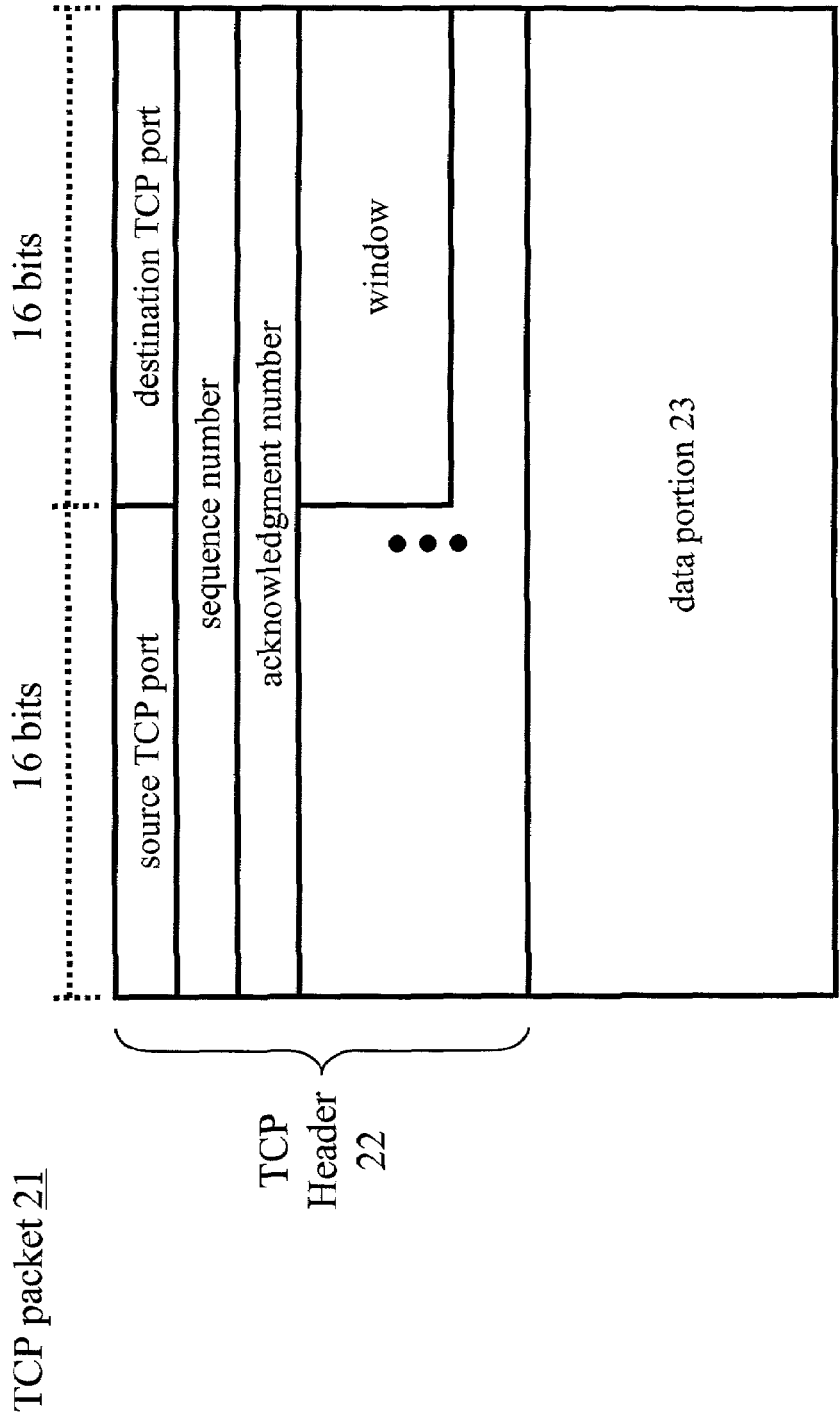
FIGS. 2 and 3 show portions of TCP and IP packets.

In particular, the TCP portion treats data as a stream of bytes, which are packaged into TCP packets for transmission and reception. An illustrative TCP packet 21 is shown in FIG. 2. TCP packet 21 comprises a TCP header 22 and a data portion 23. The TCP header 22 comprises a sixteen bit source TCP port number field, a sixteen bit destination TCP port number field, a thirty-two bit sequence number field (described below), a thirty-two bit acknowledgement number field (described below), a sixteen bit window size, etc. While port numbers can range from 1 to 65535, the port numbers 1 through 1024 are reserved for "well known" applications. For example, a file-transfer-protocol (ftp) server is predefined as being associated with TCP port 21. Data portion 23 comprises a sequence of bytes (e.g., from 1 to 64K bytes, where the symbol K denotes 1024 bytes).

As noted above, the TCP portion performs end-to-end error recovery between local and remote endpoints using the above-mentioned sequence number and acknowledgement number fields. Since the TCP portion treats the data as a stream of bytes, the TCP portion logically assigns a sequence number value to each byte being sent using the above-mentioned sequence number field. This allows a corresponding TCP receiver at the remote end to determine where it is in the receive sequence and to detect missing, out of order, or out of window data. Conversely, the acknowledgement number value represents information related to the received data and is an indication to the remote TCP endpoint of the data that, so far, has been correctly received by the local endpoint. The value of the sixteen bit window field supplied in TCP packet 21 reflects the number of data bytes the remote dialog will accept, relative to the acknowledgement number in the TCP packet (also referred to as a "window size update").

The IP portion also provides some connection management functions, such as performing route determination—i.e., deciding how to route the data between the local machine and the remote machine and IP packet size. The data functions performed by the IP portion include, e.g., the fragmentation of outgoing TCP packets and the re-assembly of incoming TCP packets, and the packaging of data into IP packets for transmission over the network. (The IP portion can also be viewed as providing the network layer as defined within the OSI reference model.)

Figure 3:
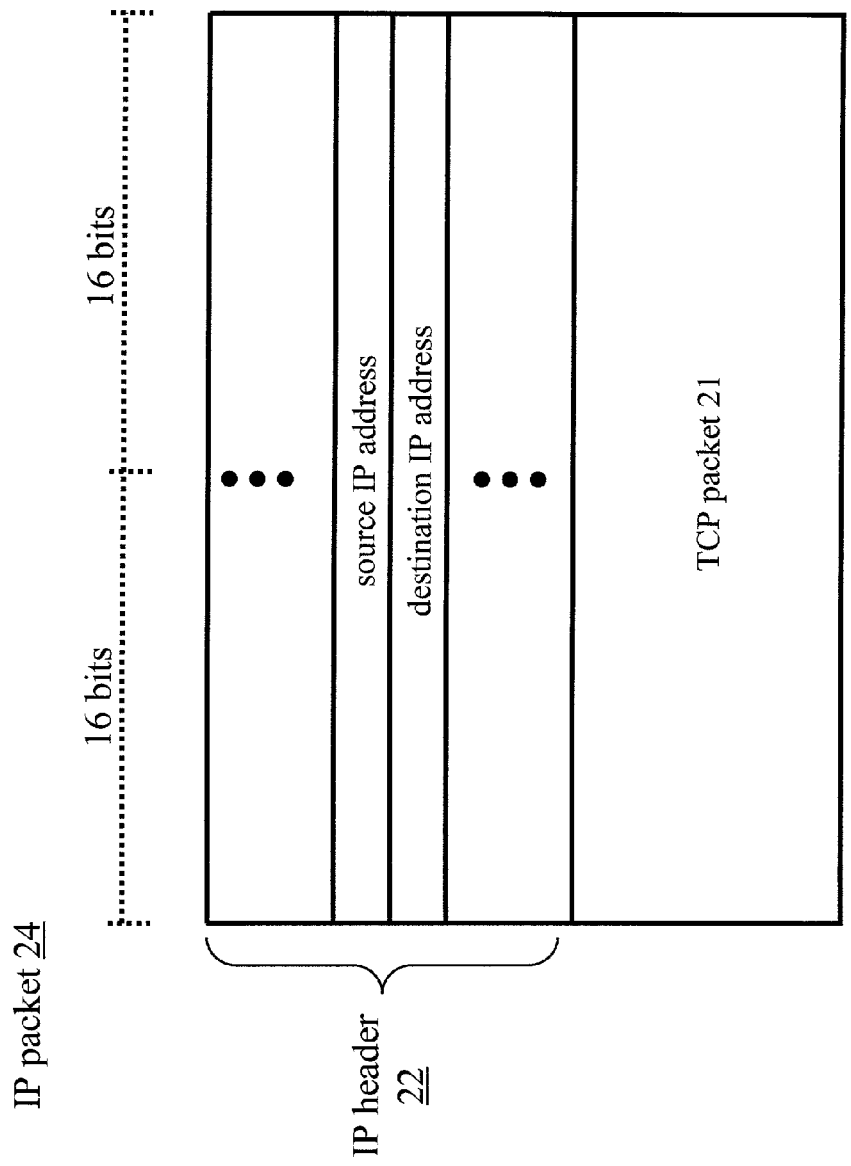

An illustrative IP packet 24 is shown in FIG. 3. As can be observed from FIG. 3, the IP portion encapsulates the TCP packet into its own packet and adds, e.g., IP header 22, some of which is shown in FIG. 3. IP header 22 comprises a thirty two bit source IP address field and a thirty two bit destination IP address field. The IP addresses are associated with the IP address of each machine associated with the particular applications. (It should also be noted that TCP may also build the IP packet once the IP routing information and IP packet size is determined by the IP layer.)

When one application (e.g., a local application) needs to establish a connection with another (e.g., a remote application) over a network, the local application sends an "open" request to TCP/IP stack 10. (This is also known as a "directed open.") Conversely, a corresponding connection, with the local TCP source port matching the destination TCP port of the open request, must be present on the remote system. (This is known as a "passive open.") The receipt of a request from a remote application to open a connection begins the TCP open handshake processing. If the connection can be established, TCP/IP stack 10 establishes a "socket" identification for the connection. An illustrative socket 30 is illustrated in FIG. 4. Socket 30 comprises information representative of the local application, e.g., the source TCP port number associated with the local application and the source IP address of the local machine, along with information concerning the remote application, e.g., the destination IP address of the remote endpoint (machine) and the destination TCP port number that is associated with the remote application on the remote endpoint. In terms of originating a connection, the values comprising this socket information are known a priori by the local application. After a connection is established, the local application sends data to, and, perhaps, receives data from, the remote application—i.e., the local application has a "dialog" with the remote application. (As used herein, the terms "connection" and "dialog" will be used interchangeably.)

Figure 5:
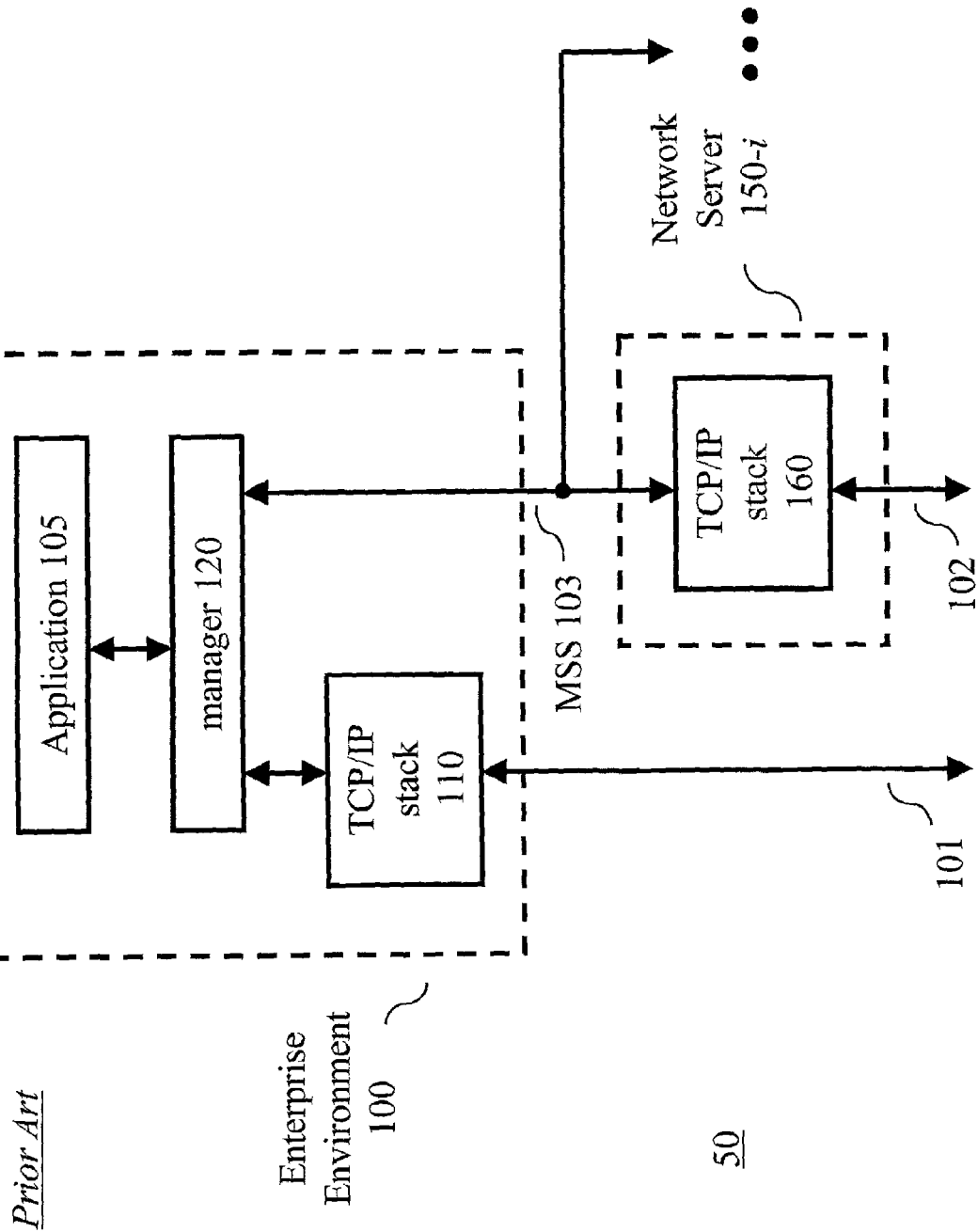
FIG. 5 shows a prior art heterogeneous application platform.

A prior art heterogeneous application platform (also referred to herein as an heterogeneous multiprocessor (HMP)) 50, such as that described in the above-mentioned U.S. patent of Narisi et al., is illustrated in FIG. 5. HMP 50 comprises an enterprise environment 100 (e.g., a Unisys ClearPath HMP® enterprise server (or enterprise platform)) and at least one network server (or network platform) 150-$i$ (e.g., a Microsoft Windows NT® server (or box)), where $i \geqq 1$. Enterprise environment 100 supports execution of one, or more, applications—as represented by application 105. The latter establishes connections with remote applications (not shown) over a network (not shown) using either TCP/IP stack 110 (in enterprise environment 100) or TCP/IP stack 160 (in network server 150-$i$), via manager 120. (The particular TCP/IP stack used is transparent to application 105.) Paths 101 and 102 are representative of lower levels of processing and coupling through appropriate devices (e.g., a network interface card (NIC)) to a transmission network. As such, paths 101 and 102 include, e.g., device drivers that translate between particular devices and the network protocols (such as TCP/IP). It is assumed herein, that the interface between the network protocols and the device drivers conform to the known Network Driver Interface Specification (NDIS). Messaging Subsystem (MSS) 103 is representative of additional processing needed to communicate both control and data between enterprise environment 100 and each network server 150-$i$. MSS presents a common, inter-connect independent interface (e.g., see the above-mentioned U.S. patent of Narisi et al.). The architecture illustrated by HMP 50 allows an application (e.g., application 105) the flexibility, via manager 120, of using either the "legacy" TCP/IP stack 110 or a network server TCP/IP stack 160 to communicate with remote applications. It should be noted that devices on path 101 may be located in a network server 150-$i$.

As noted above, when a local application (e.g., application 105) has a connection (as represented by, e.g., socket 30 of FIG. 3) with a remote application, whether through TCP/IP stack 110 or TCP/IP stack 160, application 105 then has a dialog with the remote application. As part of this dialog, TCP manages the end-to-end error recovery.

If the dialog is through TCP/IP stack 110, and the device becomes unavailable, TCP/IP stack 110 may perform dialog recovery by selecting, if available, a different device coupled to path 101. In dialog recovery, the dialog—in effect—is continued using the different device and this is transparent to the applications. It should be noted that this form of dialog recovery merely uses a different route—there is no movement of the dialog (described further below).

However, if the connection is through TCP/IP stack 160 and network server 150-$i$ "disappears"—this connection is lost and any ongoing transaction is terminated. (For example, a hardware failure could cause the NT box that is "hosting" the connection to "disappear" from the viewpoint of application 105.) Such a failure of the network server then requires application 105 to start over, i.e., re-establish the connection to the remote application through, e.g., a different one of the i network servers, and re-initiate the dialog. In addition, such a failure probably causes application 105 to have to re-send data already received by the remote application as if the earlier dialog had never happened. In other words, the TCP portion of TCP/IP stack 160 does not provide any form of dialog recovery if the hosting network server fails—or if the connection fails and there is no available device with the hosting network server.

Off-Loaded Data Path (ODP)

Figure 6:
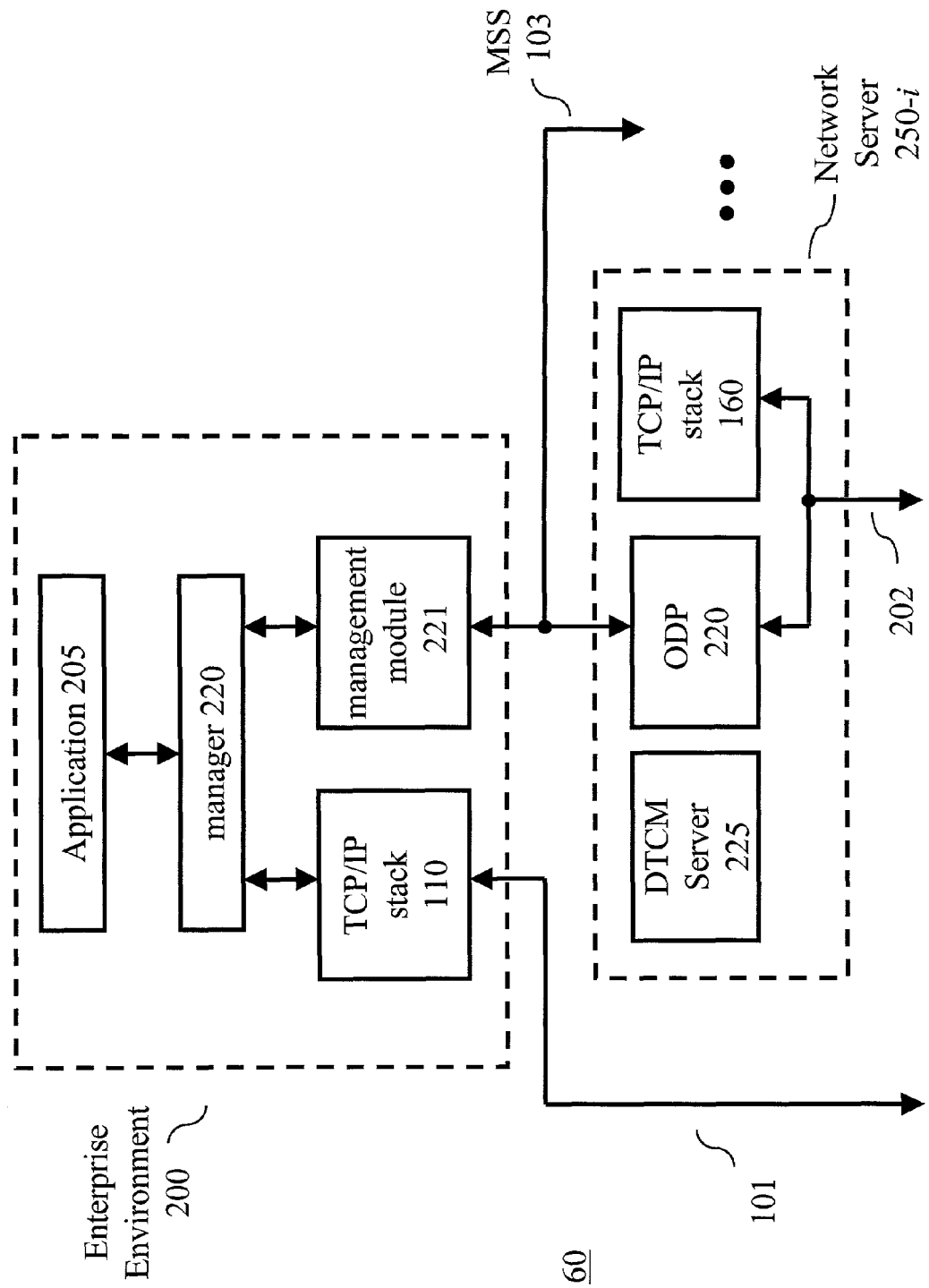
FIG. 6 shows an illustrative heterogeneous application platform in accordance with the principles of the invention.

An HMP in accordance with the invention is shown in FIG. 6. Other than the inventive concept, the elements shown in FIG. 6 are well known and will not be described in detail. Further, the inventive concept is implemented using conventional programming techniques, which as such, will not be described herein. (Similarly, exception handling will become apparent from the below descriptions of the various flow charts and, as such, is not described herein.) Also, like numbers from previously described figures indicate like elements and will not be described further.

HMP 60 comprises enterprise environment 200 (e.g., a Unisys ClearPath HMP® enterprise server) and at least one network server 250-$i$, where $i \geq 1$, (e.g., a Microsoft Windows NT® server (or box)). Enterprise environment 200 supports execution of one or more applications—as represented by application 205. The latter establishes connections with remote applications (not shown) over a network (not shown) using either TCP/IP stack 110 (in enterprise environment 200) or through Off-loaded Data Path (ODP) element 220.

It should be observed from FIG. 6, that network server 250-$i$ also comprises TCP/IP stack 160. (Applications running in network server 250-$i$ may use TCP/IP stack 160.) Like FIG. 5, paths 101 and 202 are representative of lower levels of processing and coupling through appropriate devices (e.g., a network interface card (NIC)) to a transmission network. As such, paths 101 and 202 include, e.g., device drivers that translate between particular devices and the network protocols. It is assumed herein, that the interface between the network protocols and the device drivers conform to NDIS. It should also be observed that path 202 interfaces to both ODP 220 and to TCP/IP stack 160. In this context, path 202 represents, as known in the art, a "shared adapter" and allows associated devices—as represented by path 202—to be used by either ODP 220 or TCP/IP stack 160 of each network server 250-$i$ (e.g., see the above-mentioned U.S. patent application Ser. No. 09/418,083). The architecture illustrated by HMP 60 allows an application (e.g., application 205) the flexibility of using either the "legacy" TCP/IP stack 110 or ODP 220 to communicate with remote applications. (In effect, legacy TCP/IP stack 110 and management module 221 co-exist in enterprise environment 200, while ODP 220 and TCP/IP stack 160 coexist in network server 250-$i$.) It should be observed that Distributed TCP/IP Communications Manager (DTCM) Server 225 is shown for completeness. DTCM Server 225 manages any distinctions between offloaded dialogs (further described below) and dialogs using Virtual Transport (not described herein, e.g., see the above-mentioned U.S. patent issued to Narisi et al.).

Figure 7:
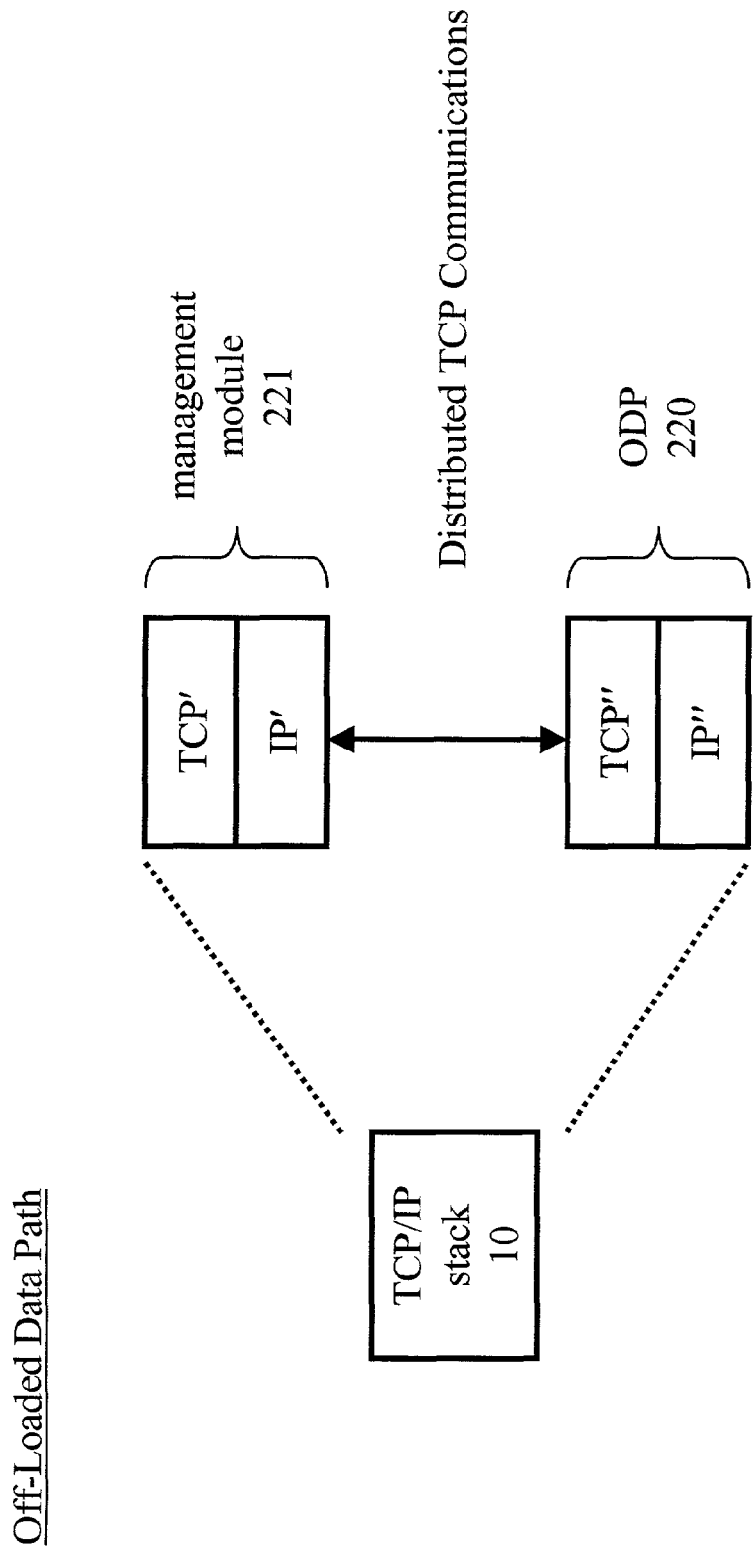
FIG. 7 shows an illustrative off-loaded data path.

The "Off-Loaded Data Path" is shown in more detail in FIG. 7. As represented in FIG. 7, and other than the inventive concept, the "Off-Loaded Data Path" provides at least standard TCP/IP functionality—albeit now in two different environments. In particular, a TCP/IP stack 10 is functionally divided so that the management functions are substantially performed in enterprise environment 200 via management module 221 while data functions are substantially performed in a network server 250-$i$ via ODP element 220. This is also referred to herein as "distributed TCP communications." (This is a variation of the approach described in the above-mentioned U.S. patent application Ser. No. 09/418,083, in which the TCP/IP management functions are also executed in the network server 250-$i$.) Management module 221 comprises a TCP' element and an IP' element, both of which primarily represent management-type functions. For example, TCP' handles, "open," "close," and "end-to-end error recovery," while IP' handles routing management. In a complementary fashion, ODP element 220 comprises a TCP" element and an IP" element, both of which primarily represent data-type functions. For example, TCP" provides TCP packets; while IP" provides IP packets. In addition, other than as noted below, TCP" performs handshaking with the remote peer. Since, in this architecture, connection management functions are performed in one processing environment while data functions are performed in (i.e., offloaded to) another processing environment—this is referred to as an "off-loaded data path."

Figure 8:
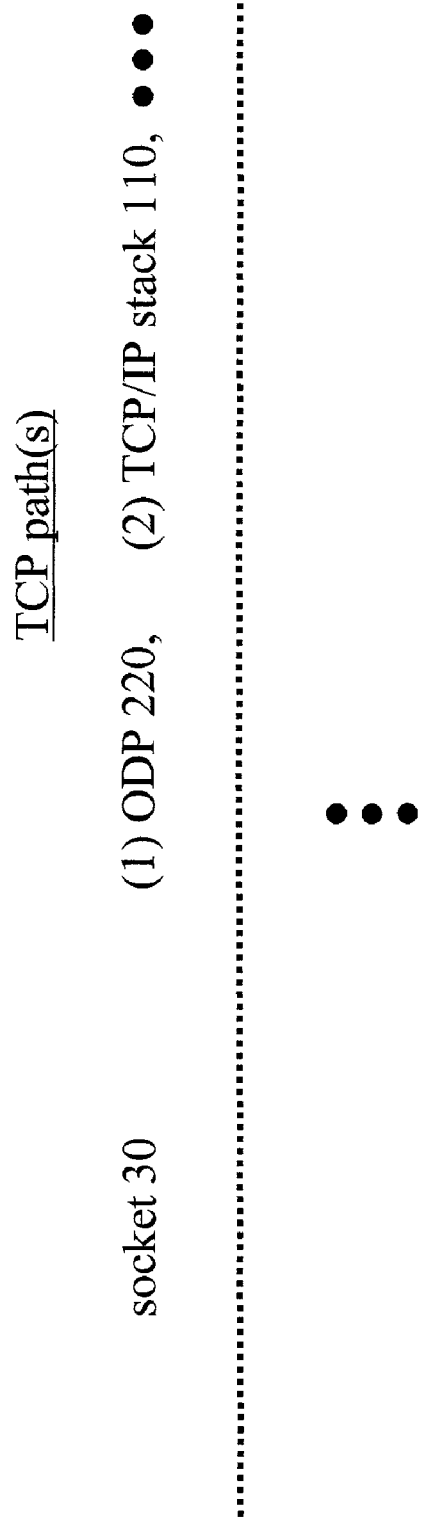
FIG. 8 shows illustrative network information.

It is assumed for the purposes of this description that network information is maintained in, or accessible by, enterprise environment 200 (e.g., in memory (not shown) of enterprise environment 200). This network information is determined a priori and/or updated in real-time. Illustrative network information 40 is shown in FIG. 8. Network information 40 comprises a table of information relating local applications, remote applications—as represented by socket 30, of FIG. 4—and associated TCP/IP paths within HMP 60. It should be noted that this network information may include preference information. For example, network information 40 indicates a preference to use (via the numerals (1) and (2)), ODP 220 (if possible) before using the legacy TCP/IP stack 110. (Although not shown in FIG. 8, if an ODP 220 preference is indicated, there is additional information relating to the available network servers 250-$i$ that may be used to access a particular remote IP address.) As such, when application 205 initiates a connection with a remote application, enterprise environment 200 selects (e.g., as represented by manager 220 of FIG. 6) the TCP/IP path from network information 40.

Figure 9:
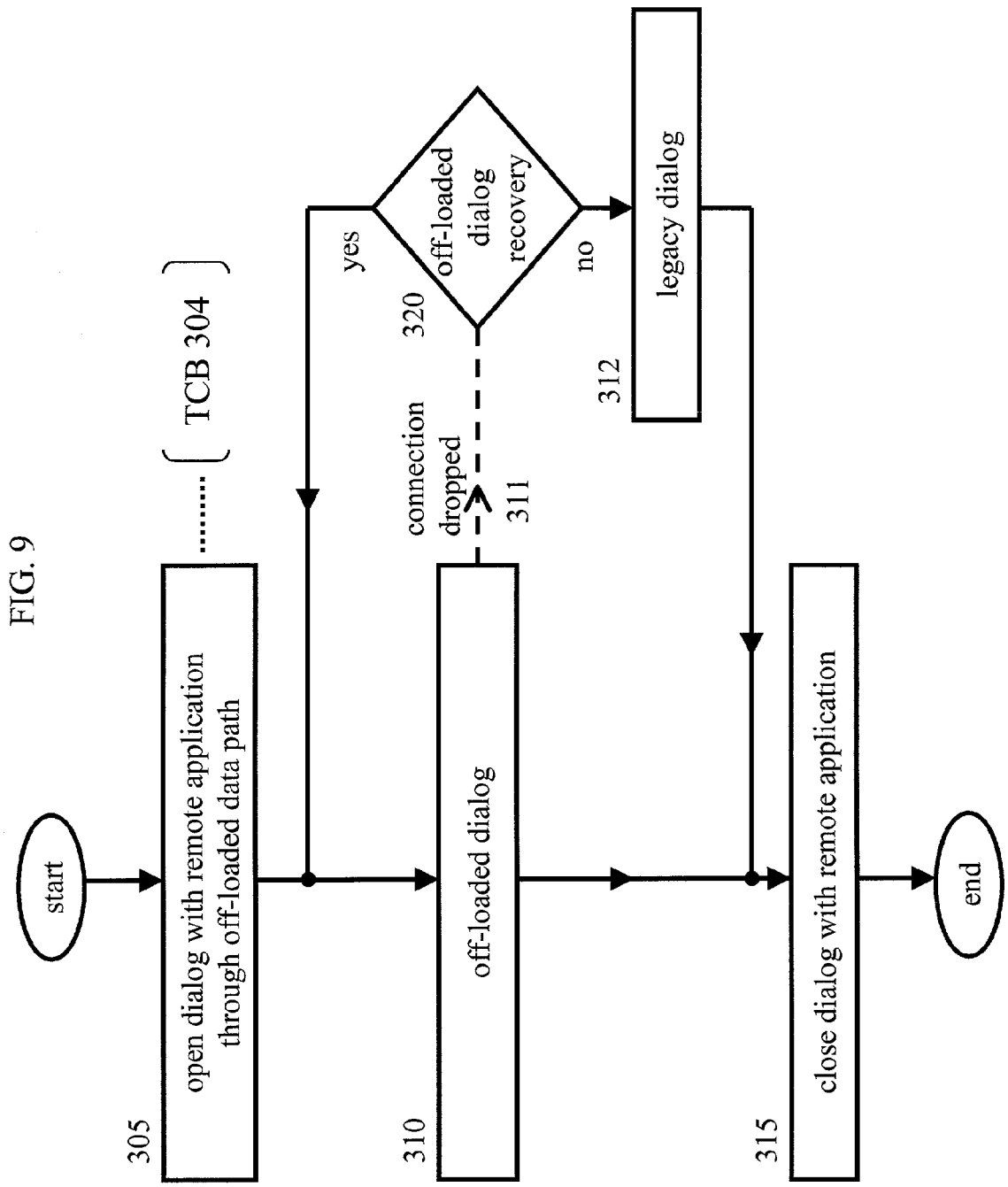
FIG. 9 shows an illustrative flow chart for use in establishing an off-loaded dialog.

Turning now to FIG. 9, an illustrative flowchart is shown for use in establishing a dialog (or data session) through ODP 220, i.e., establishing an off-loaded dialog. (Again, it is assumed that selection of ODP 220 for connection to a particular remote application is predetermined as described above.) In step 305, application 205 opens a dialog with a remote application through ODP 220. As part of this process, a TCP control block (TCB) 304 is created and stored in a memory (not shown) of enterprise environment 200. TCB 304 is associated with this dialog and exists for the life of this dialog (as such, there is a table of dialogs and associated TCBs). An illustrative TCB 304 for this dialog is shown in FIG. 10. TCB 304 comprises socket 306, and other routing information 307, which includes, e.g., within HMP 60, the network server being used, and, external to HMP 60, the "next hop" (if any) needed to route packets to the remote IP address (which, as known in the art, is identified in socket 306). In addition, TCB 304 also comprises additional data 308, which comprises, e.g., the current value of bytes sent and bytes received (synchronization and acknowledgement information) and IP packet size.

Figure 11:
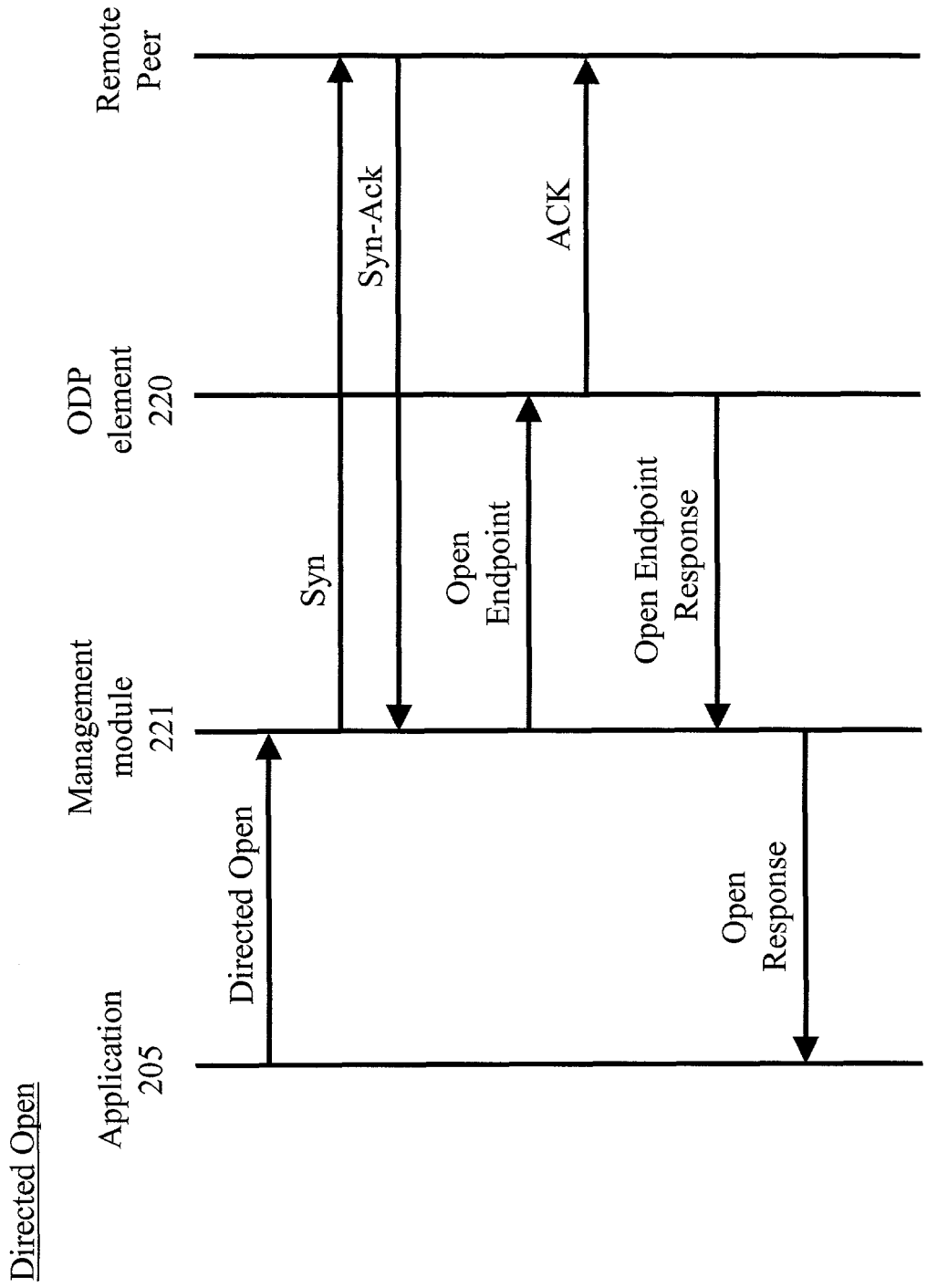
FIGS. 11-15 illustrate messaging sequences of an off-loaded dialog;
dialog recovery.

An illustrative message flow for opening a connection between the local and remote applications is shown in FIG. 11. As can be observed from FIG. 11, this is a "directed open." Application 205 sends an open message (including the information represented by socket 306) to management module 221. (Other than the inventive concept, the notion of a message exchange between, e.g., software modules, is well known and not described herein.) Management module 221 creates the above-mentioned TCB 304 (also described further below) and sends a "Syn" message to the remote peer. (For simplicity, the corresponding remote TCP/IP stack and remote application are show as one entity—the "remote peer." Those in the art appreciate that some messages will terminate at the remote TCP/IP stack and that some messages are exchanged between the remote TCP/IP stack and the remote application.) Management module 221 then waits for receipt of a "syn-ack" message from the remote peer. (Syn and syn-ack messages are known in the art for establishing a TCP dialog between two applications.) Upon receipt of the syn-ack message, which indicates the availability of the remote application, management module 221 sends an open endpoint message to ODP element 220 for this dialog. The open endpoint message includes TCB 304 information (which is used by ODP element 220 to build TCP packets and IP packets). ODP element 220 then generates an acknowledgement (ACK) message to the remote peer, completing the handshake for opening the dialog. To indicate the completion of the open process at HMP 60, ODP element 220 then sends an open endpoint response message to management module 221, which provides an open response message to application 205.

Figure 12:
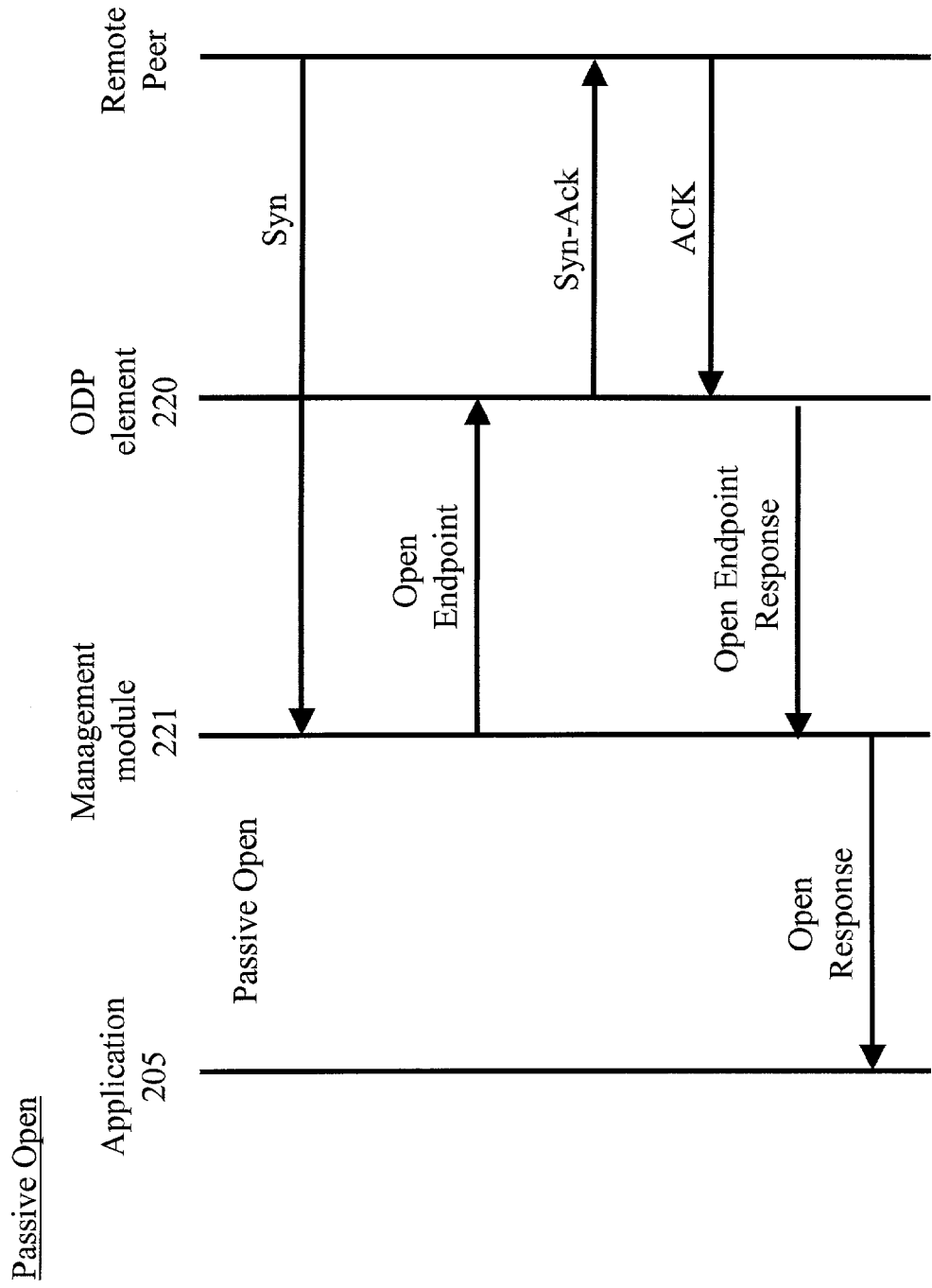

It should be observed, in accordance with the off-loaded data path architecture, that management module 221 initiated the opening of the dialog (via the syn/syn-ack message exchange), while ODP element 220 performed the handshaking once it was determined that the dialog could be opened. For comparison purposes, a passive open is illustrated in FIG. 12. Again, management module 221 manages the creation of the dialog (via receipt of the syn message). Management module 221 sends an open endpoint message to ODP element 220, which—since the dialog has been created—provides the syn-ack message to the remote peer. Upon receipt of the ACK from the remote peer, ODP element 220 sends an open endpoint response message to management module 221, which provides an open response message to application 205. (Other message sequence illustrations, described below, further highlight the partitioning of the various TCP/IP related functions between management module 221 and ODP element 220.)

Returning to FIG. 9, upon successfully opening the dialog to the remote application, application 205 has an off-loaded dialog with the remote application, i.e., data is communicated between application 205 and the remote application in step 310 using distributed TCP communications in HMP 60. Illustrative message sequences for data sent to, and received from, the remote peer are shown in FIGS. 13 and 14, respectively.

Figure 13:
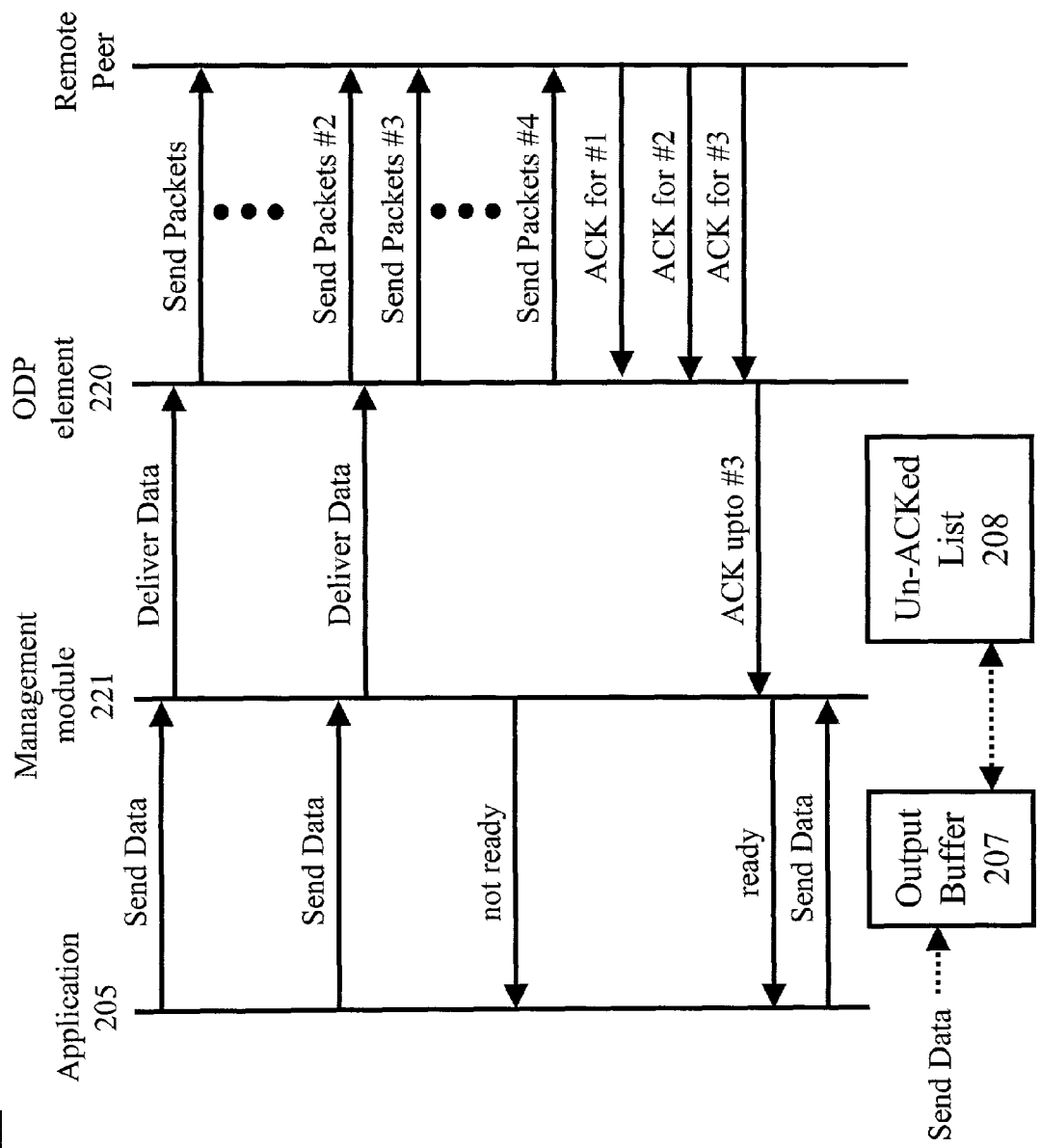

In FIG. 13, application 205 sends data to management module 221, which delivers the data to ODP element 220. The latter forms packets for transmission to the remote peer. For each dialog, management module 221 comprises a transmission window of a predefined size (e.g., 64K bytes) as represented by output data buffer 207 (which is stored within enterprise environment 200). Management module 221 continues to accept data from the dialog for transmission to the remote peer until output buffer 207 is filled up with un-acknowledged (un-ACKed) data. At this point, management module 221 provides a not ready message to application 205. As indicated in FIG. 13, management module 221 maintains an un-ACKed list 208 of what data is still waiting for an acknowledgement. Generally speaking (unlike what is shown in FIG. 13), once ODP element 220 receives an ACK message from the remote peer indicating the successful receipt of some of the data at the remote endpoint, this information is passed up to management module 221. (A more detailed explanation of the ACK sequence between ODP element 220 and management module 221, as illustrated in FIG. 13, is provided below.) Upon receipt of ACK information from ODP element 220, management module 221 deletes the acknowledged data from output buffer 207 and updates un-acked list 208. (As known in the art, an ACK message includes sequence numbers that are used to track what data has been correctly received. TCP is a byte-stream oriented protocol and the sequence number is used to track the corresponding byte in output buffer 207 that has been successfully transmitted.) At this point, management module 221 provides a ready message to application 205 and management module 221 again accepts data into output buffer 207 for transmission.

Figure 14:
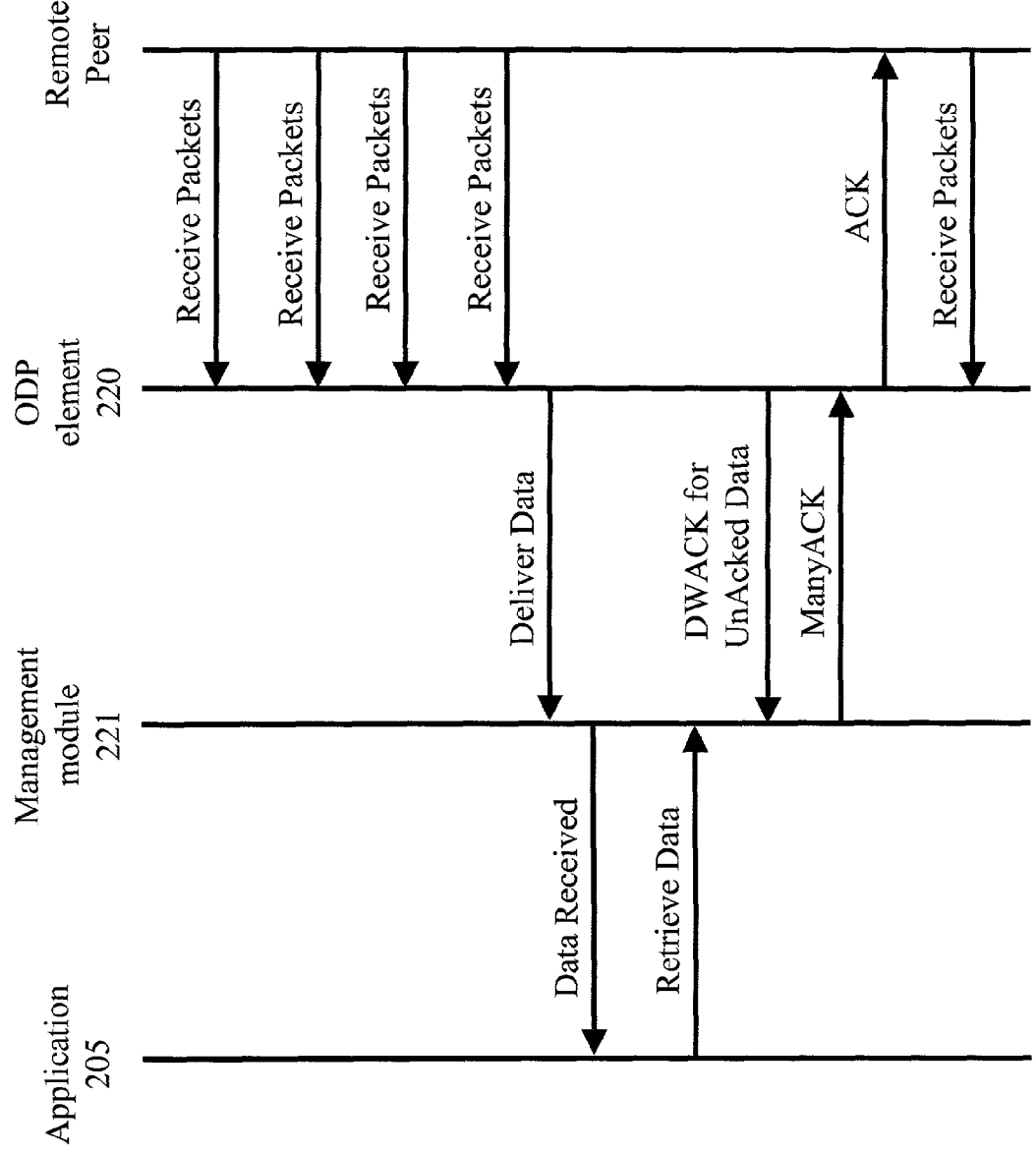

For data received from the remote application, an illustrative message sequence is shown in FIG. 14. As can be observed from FIG. 14, ODP element 220 receives packets from the remote peer and, after accumulating a predefined number of packets destined for application 205 (described further below), delivers data to management module 221. The latter provides a data received message to application 205, which then retrieves the data. ODP element 220 provides a Demand Window Acknowledgement (DWACK) for unacknowledged (Un-ACKed) data to management module 221. In response, management module 221 then provides a ManyACK message to ODP element 220, which provides an ACK message to the remote peer. (The acknowledgement mechanism shown in FIG. 14 is described further below.)

Figure 15:
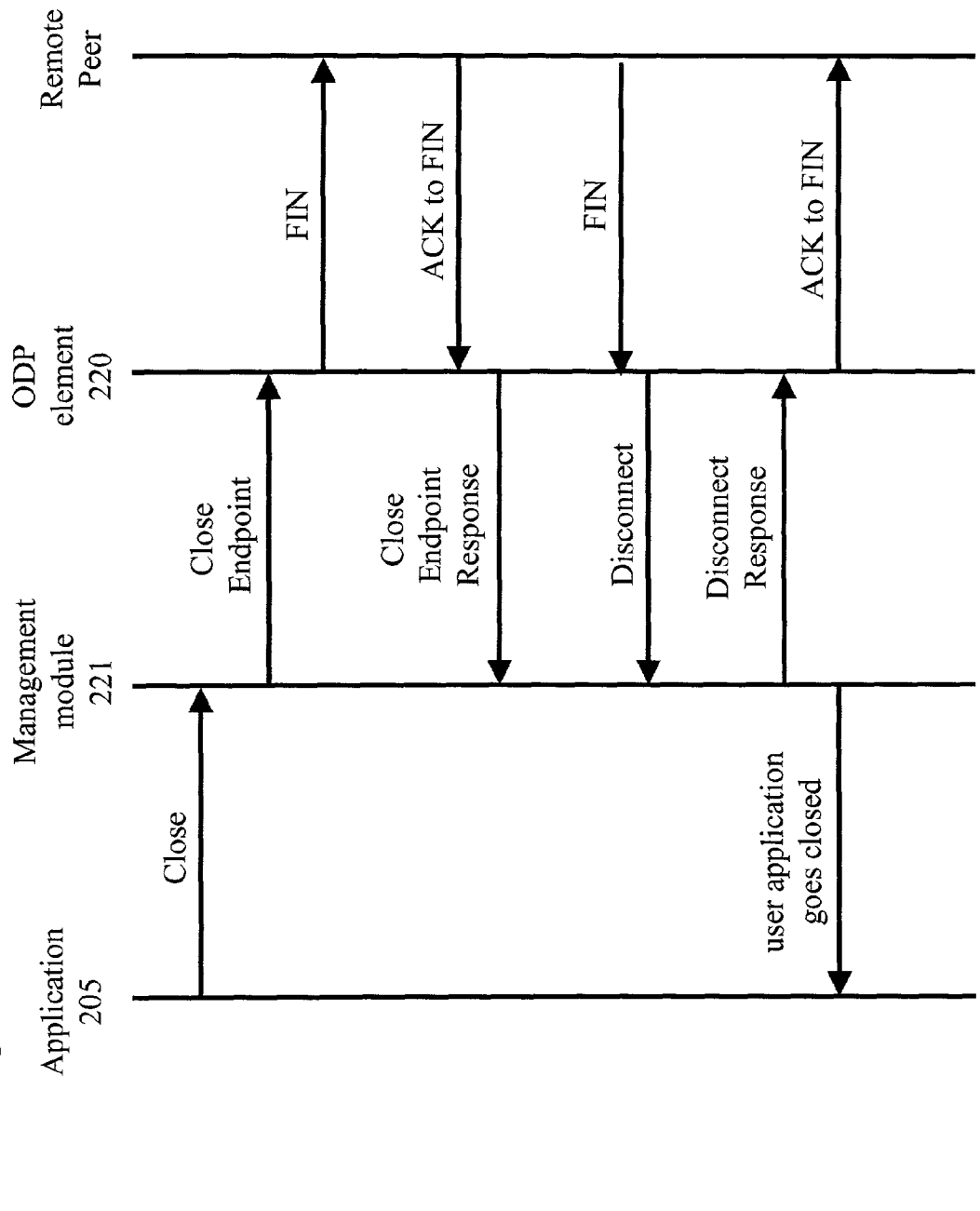

Returning to FIG. 9, at the end of the dialog, the dialog is closed in step 315. An illustrative message flow for closing a dialog between the local and remote applications is shown in FIG. 15. Application 205 sends a close message (including the information represented by socket 306) to management module 221. The latter sends a close endpoint message to ODP element 220, which sends a FIN message to the remote peer. Upon receiving an ACK to FIN message from the remote peer, ODP element 220 passes this information along to management module 221 via a close endpoint response message. Upon receipt of a subsequent FIN message, ODP element 220 provides a message indicating a disconnect of the dialog to management module 221, which replies with a disconnect response message. ODP element 220 then provides an ACK to FIN message to the remote peer. (FIN and ACK to FIN messages are known in the art for terminating a dialog.)

Dialog Recovery

As noted earlier, a dialog supported by TCP/IP stack 160, of a network server 150-i of HMP 50 of FIG. 5, cannot be recovered if the network server itself fails. However, the use of ODP element 220 of FIG. 6 now enables off-loaded dialog recovery. This feature is illustrated in FIG. 9. During the off-loaded dialog it is possible that the network server becomes unavailable as illustrated by line 311. In other words, communication with the remote peer is lost unexpectedly (e.g., the respective network server has failed, or an element in the physical layer of the connection has failed, etc.).

When the management module 221 is informed that a network server is unavailable (via messages from networking management software resident in enterprise environment 200 (not shown)), dialog recovery is attempted in step 320 (described further below). If offload dialog recovery is successful, the dialog continues in step 310. If offload dialog recovery is unsuccessful, the dialog is recovered as a legacy dialog (i.e., the dialog is moved to legacy TCP/IP stack 110) and the dialog continues in step 312. (If the legacy dialog fails to send unacked or new data because a legacy device is unavailable, the dialog will eventually timeout and reset/terminate. Also, it should be observed that although dialog recovery is illustrated in FIG. 9 in the context of a directed open, dialog recovery is applicable in a similar fashion for a passive open.)

Figure 16:
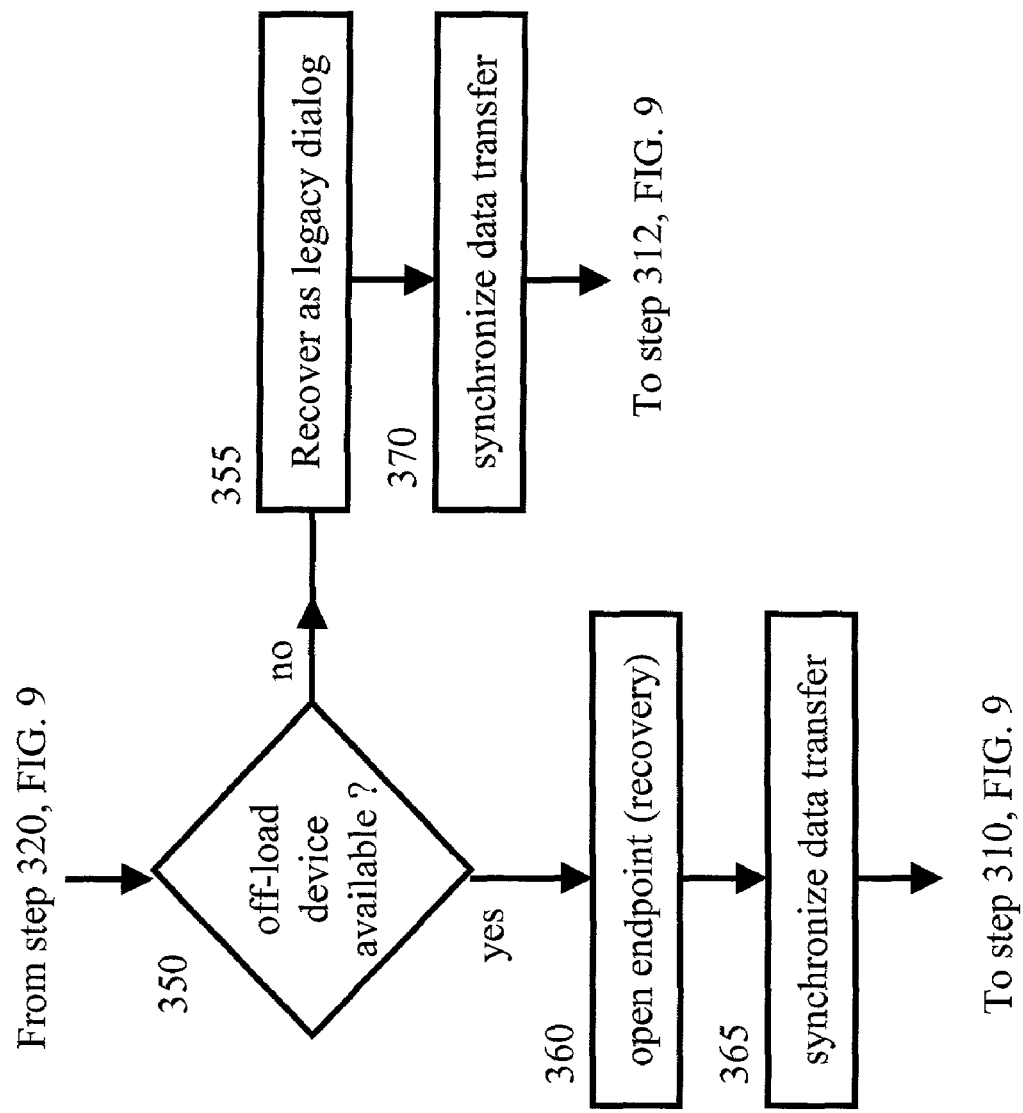
FIGS. 16-18 illustrate dialog recovery for an off-loaded dialog.
Figure 17:
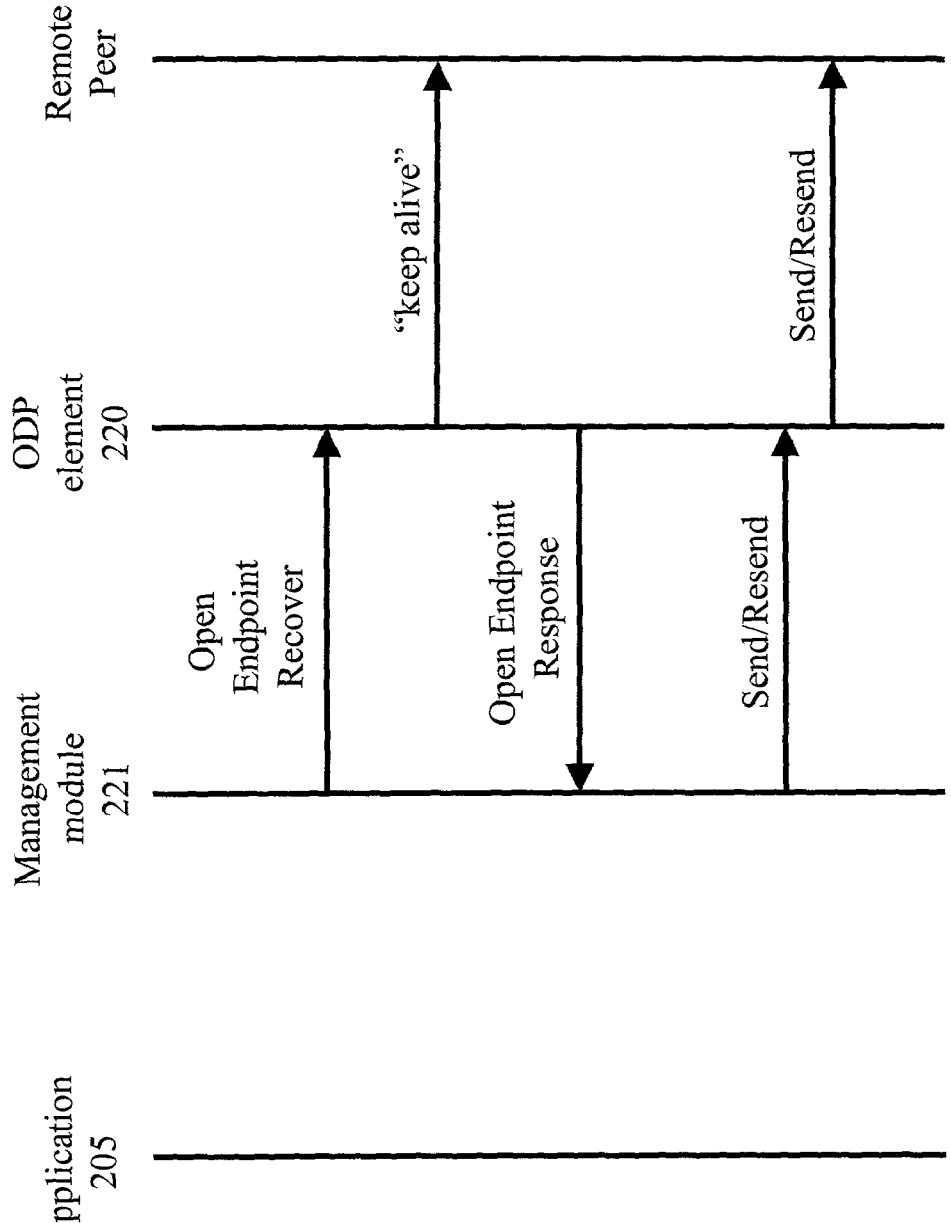

Turning now to FIG. 16, an illustrative flow chart for dialog recovery is shown. (Reference can also be made to FIG. 17, which shows an illustrative message sequence.) In step 350, management module 221 of enterprise environment 200 checks if an off-load capable device is available in HMP 60. As noted above, it is assumed that networking information is available within HMP 60 as to which network servers can be used to connect to particular IP addresses. In this context, in step 350, the network information is searched for a network server 250-$k$ that can both access the remote IP address for the existing dialog and support an ODP. If an off-load capable device is not available (e.g., a network server is available but it does not support an ODP element 220), then the connection is recovered as a legacy dialog and the dialog is moved to TCP/IP stack 110 (steps 355 and 370) and the process returns to step 312 of FIG. 9. Similarly, if neither a legacy or offload capable network server are available, the dialog is recovered as a legacy dialog and will attempt to resend data per TCP protocol specification. However, if an off-load capable device (e.g., a network server 250-$k$) is available in step 350, then, in step 360, management module 221 sends an open endpoint recover message (including the information in TCB 304) to ODP element 220 of the network server 250-$k$ selected in step 360. ODP element 220 of network server 250-$k$ then sends a "keep alive" message as known in the art to the remote peer (to synchronize data transfer information with the remote peer). ODP element 220 also provides an open endpoint response message to management module 221 acknowledging that the dialog has been moved to network server 250-$k$. The keep-alive exchange sent by ODP element 220 performs data synchronization with the remote peer exchanging current sequence number and window information to determine what data has been successfully received by the remote peer and read by the remote application (send/resend message sequence shown in FIG. 17). In step 365, data previously transmitted but indicated as un-ACKed by the remote peer, is resent by management module 221, and any ACKed data is deleted from output buffer 207 (described earlier). (There is no "request for retransmission" of received data. If incoming data is lost due to a failure, it will be resent by the remote dialog (via TCPIP retransmission logic) due to the fact that it has not yet been acknowledged by the receiving (local) dialog.) After the data has been synchronized with the remote peer, the dialog between application 205 and the remote application continues in step 310 of FIG. 9. (In effect, by maintaining a copy of the previously transmitted data in output buffer 207, it is possible to continue the dialog at the point when the network server went down.) Consequently, application 205 keeps the existing socket (here, represented by socket 306) but is able to use a different network server for the same dialog. (It should be noted that although dialog recovery was illustrated in the context of the original network server failing, it may be the case that a problem occurs, e.g., at a physical layer of the connection between application 205 and the remote application. In this case, an attempt can be made within step 350 to check if another off-load capable device is available within the same network server, e.g., network server 250-$i$. If another offload capable interface within the same network server is available, the dialog recovery mechanism is not initiated as there is no need to move the dialog. Instead, an IP route update notification message (described below) is sent to ODP element 220 to indicate that a different network interface on the same network server should be used for the dialog.)

Figure 18:
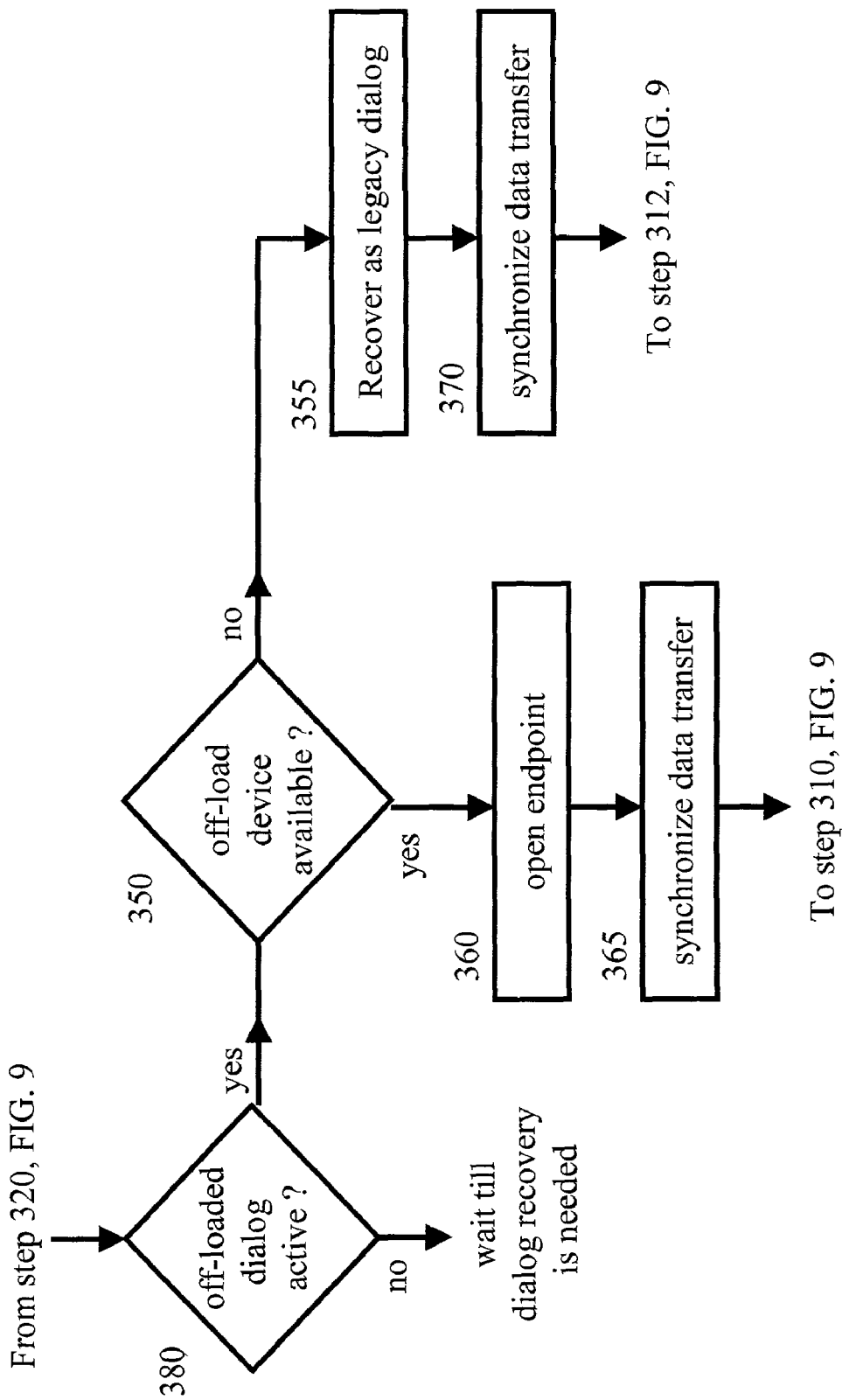

As described above, a dialog recovery capability was described for HMP 60 for an illustrative application 205. However, it should be noted that an HMP may have hundreds, if not thousands, of dialogs going on through the same NT device. (Different dialogs can exist between the same IP source and destination endpoints.) Consequently, should the network server fail, attempting dialog recovery for each and every dialog could create a performance bottleneck for the HMP. Therefore, "recovery as needed" is performed. In "recovery as needed," dialog recovery is only attempted for those off-loaded dialogs that are active, i.e., that attempt to send/receive data subsequent to the failure. Recovery is not attempted for those off-loaded dialogs that are idle. This is illustrated in FIG. 18 with the addition of step 380, which checks on a per-dialog basis if the off-loaded dialog is active or idle. If the off-loaded dialog is active, (e.g., new data or unacked data is available for transmission or new input is received), dialog recovery is attempted in step 350, as described above. If the off-loaded dialog is idle, (e.g., new data or unacked data is not available for transmission or new input is not received), then dialog recovery is delayed, until that off-loaded dialog/application becomes active. This distributes the workload of re-establishing large numbers of off-loaded dialogs over time.

It should also be noted that additional variations can be performed to the dialog recovery process described above. For example, if the device that originally failed "becomes available," then an attempt may be made to move the dialog back to the original device. Additionally, if a dialog is established using the legacy TCP stack because an offload capable device was unavailable when the dialog was initiated, this dialog may be recovered as an offloaded dialog if the offload capable device becomes available during the lifetime of the dialog.

In addition, although described in the context of using ODP element 220, network server 250-$i$ could equivalently be modified so that TCP/IP stack 160 supports the use of existing socket information for recovering a dialog. For example, TCP/IP stack 160 could be modified to be responsive to a recover dialog message such as the above described open endpoint recover message.

Input Accumulation

Returning to FIG. 14, an illustrative message flow for the receipt of data from a remote endpoint is shown. This message flow is on a per-dialog basis and is associated with a particular socket. However, if every received TCP packet associated with socket 306 is forwarded to enterprise environment 200—the latter also incurs some performance penalty because of the overhead processing associated with each TCP packet. Therefore, "input accumulation" of data is performed on a per-dialog basis as shown in FIG. 14 (also referred to as "per-socket" or "per TCP connection"). In other words, data from packets associated with the same dialog are accumulated into a larger data unit (or packet). Thus, enterprise environment 200 receives larger, but fewer, packets, which reduces any performance penalty. This larger data unit is referred to herein as an "Input Accumulation Block" (IAB). (It should be noted, that while an individual IAB may contain the accumulation over several input packets (or frames), an IAB may also contain data from only one received packet, or, in fact, only a portion of a single received packet (described below).)

Figure 19:
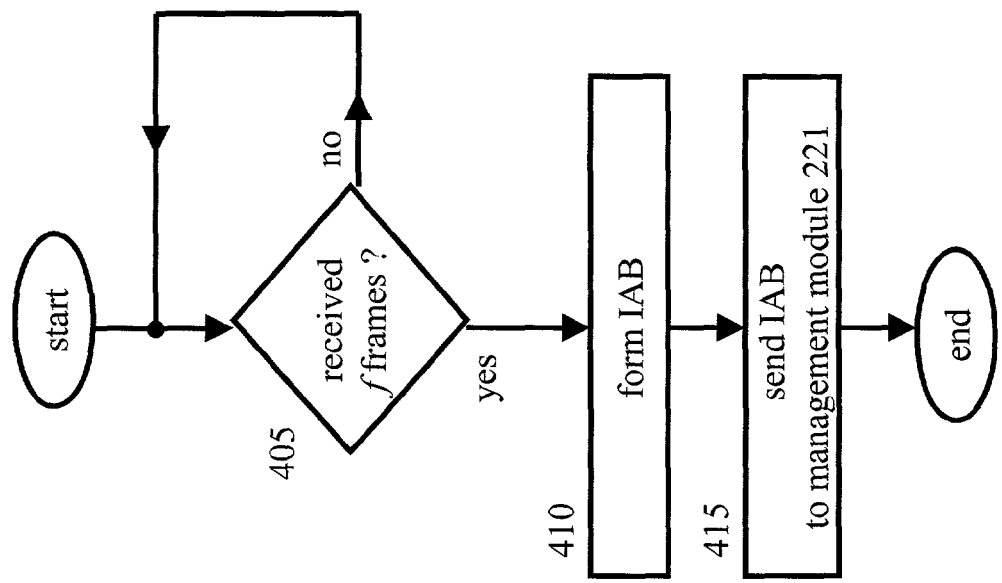
FIGS. 19-23 show illustrative flow charts for use in performing input accumulation for an off-loaded dialog.

In accordance with the ODP architecture, this data handling is performed by ODP element 220 of network server 250-*i*. A high-level view of input accumulation on a per-dialog basis is shown in the illustrative flow chart of FIG. 19. In step 405, ODP element 220 accumulates data from f received TCP packets (or frames), where f≧1. When f TCP packets have been received (e.g., f=4), then ODP element 220 forms a larger packet, the IAB, in step 410 and sends the IAB to management module 221, of enterprise environment 200, in step 415. Thus, enterprise environment 200 processes one packet (the IAB) for every f TCP frames received by the network server 250-*i*. This reduces the amount of TCP processing incurred by the enterprise environment. The value for f is determined for each dialog and may change over time.

Figure 20:
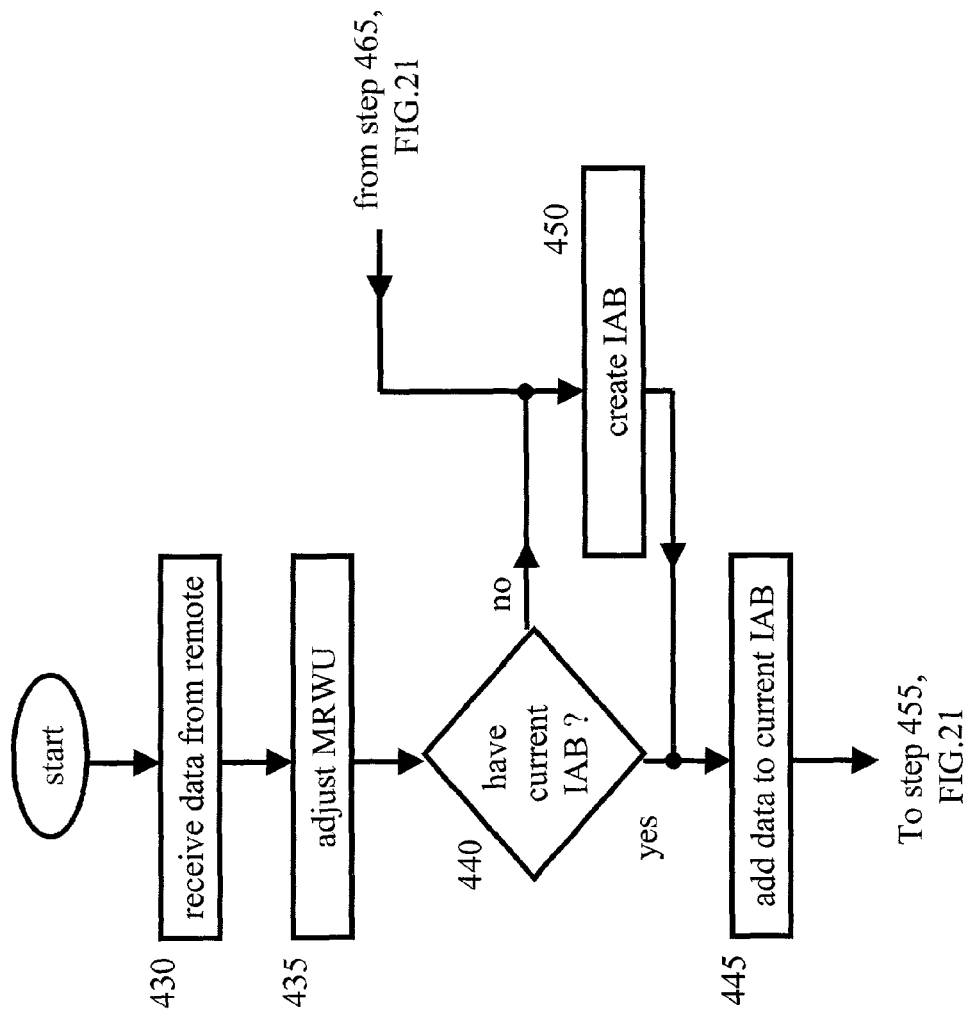
Figure 21:
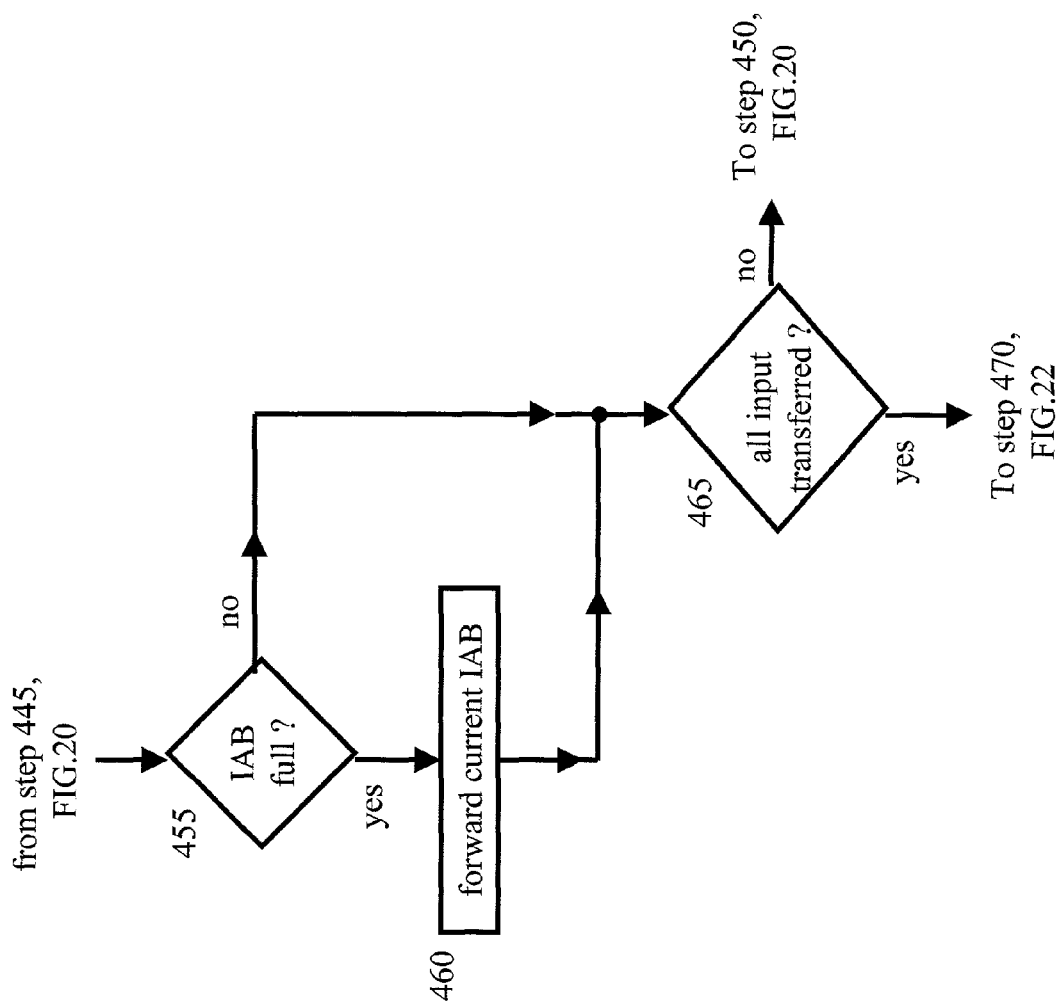
Figure 22:
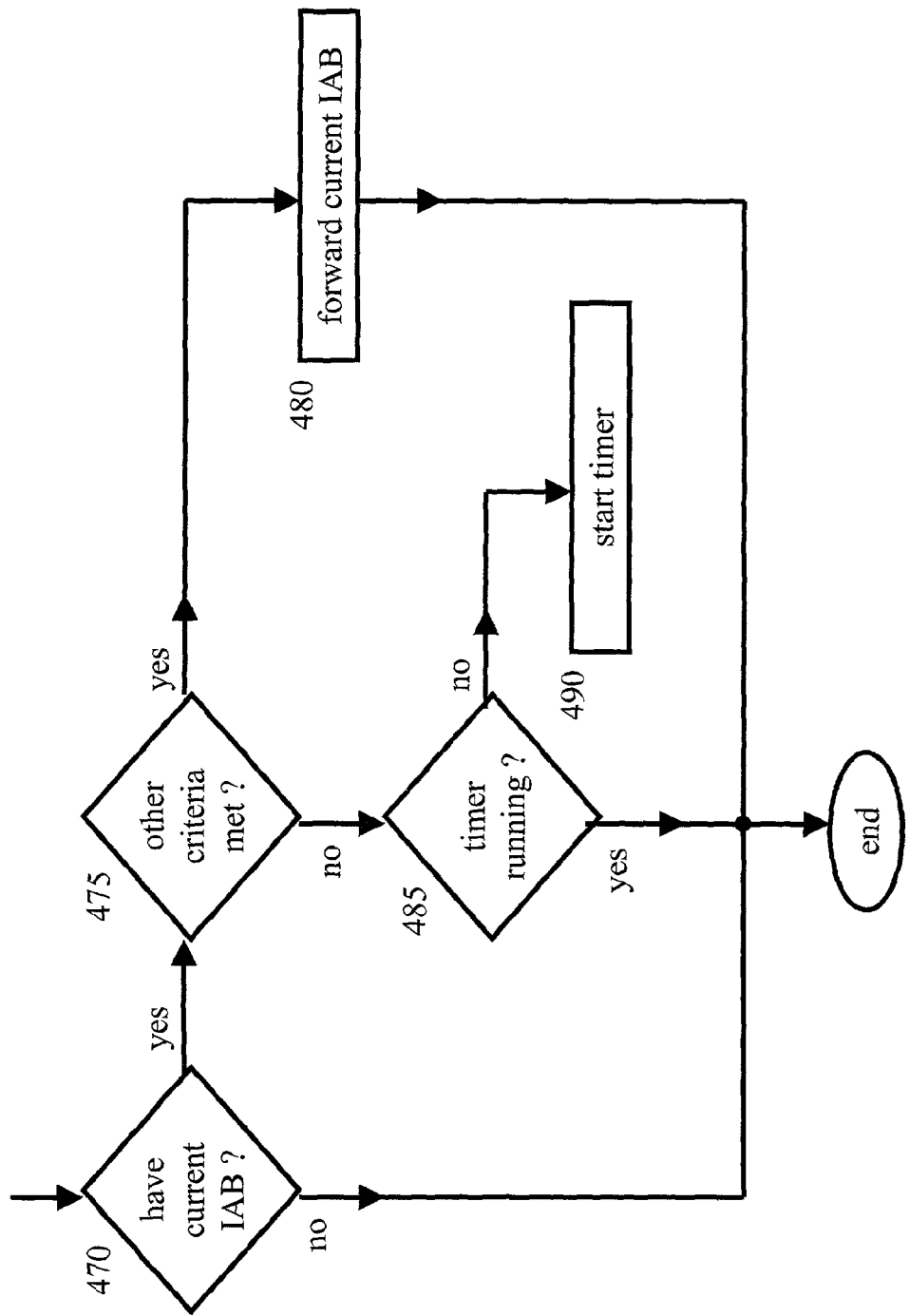

Another illustration of input accumulation on a per-dialog basis is shown in the flow charts of FIGS. 20-22. As described below, this example of input accumulation attempts to optimize the case in which large amounts of received data are available and, also, not adversely affect cases in which little or no received data is available (e.g., in "transaction-oriented" dialogs in which the normal traffic flow is alternating messages from one side of the dialog to the other.) It should be noted that the degree of optimization is dependent on many factors, including characteristics of the underlying interconnect, the arrival rate of incoming data from the remote endpoint, the segment size of the incoming link layer, and, of course, the algorithm used to accumulate data for delivery to enterprise environment 200. For example, consider the case of a LAN connection (approximately 1500 bytes of data per segment), if 21 LAN segments are accumulated from the remote endpoint—this results in a block of 32K bytes of received data.

The following definitions are made.
MAX_ACCUM_LEN: The maximum number of bytes that may be accumulated in an IAB before being forwarded to enterprise environment 200. This value applies to all dialogs. The value used should consider attributes of the implementation environment, such as the maximum transfer size on the interconnect between enterprise environment 200 and network servers 250-*i*. An illustrative value for this parameter is 65,000 bytes.
MIN_ACCUM_TIMEOUT, MAX_ACCUM_TIMEOUT: The minimum and maximum values permitted for an input accumulation timer time-out value associated with a dialog (described below). The input accumulation timeout is the amount of time accumulated received data may be held before being forwarded to enterprise environment 200. This time period is measured from receipt of the first piece of data in the IAB. Illustrative values for these parameters are 2 and 128 milliseconds, respectively.
TWO_MTU_ACK_REQUIRED: (Optional) This is a configuration option specified by a system administrator indicating whether the local system is required to acknowledge at least every second input segment, which is described as an optional requirement in Internet Engineering Task Force (IEFT) Request for Comments (RFC) 1122, "Requirements for Internet Hosts—Communications Layers," section 4.2.3.2. It should be noted that setting this option limits input accumulation for each dialog to, at most, two input frames per IAB and therefore may severely limit the effectiveness of input accumulation.

It is assumed that the following information/parameters are maintained for each dialog by, e.g., ODP element 220.
Current_IAB: If one is present, the IAB currently being built for this dialog (connection). It should be noted that at any given time, a connection may not have a Current_IAB and that only one IAB may be assembled by ODP element 220 at any time for each dialog.
Max_Receive_Window_Used (MRWU): An estimate of the maximum number of unacknowledged received data bytes from the remote side of the connection. The use and determination of this value are described below.
IA_Timer: Input accumulation timer for the dialog. This is a timer used to signal the expiration of the input-accumulation period of a connection (e.g., through use of an operating system timer). At any given time, IA_Timer of each dialog is either running or not running.
IA_Timeout_Value: The input-accumulation timeout value currently in use for this dialog.
Total_IABs: The total number of IABs generated for this dialog over time.
Total_Outputs: The total number of output data requests issued on this dialog.

Turning now to FIG. 20, in step 430, data for the dialog is received from the remote endpoint. This received data is stored in a receive buffer (not shown). In step 435, the MRWU value is updated, if appropriate (described below). In step 440, a check is made if an IAB exists for this dialog (e.g., Current_IAB is "true"). If one does not exist, ODP element 220 creates an IAB for this dialog in step 450. If a maximum size (other than MAX_ACCUM_LEN) must be determined for an IAB at allocation time (for example, when an independent data buffer must be allocated), that size can be determined by consideration of the dialog's current MRWU value (rounding MRWU up to a multiple of MTU is suggested). In either event (whether an IAB already existed or had to be created), execution proceeds to step 445, where the received data is transferred from the receive buffer to the IAB (i.e., data is added to the IAB, or, equivalently, data is bundled into the IAB). The amount of data transferred to the IAB is the minimum of the amount of data received but not yet transferred and the amount of data that will fit into the IAB.

Turning now to FIG. 21, in step 445, a check is made by ODP element 220 if the IAB is now full (i.e., the value of MAX_ACCUM_LEN or the maximum size determined at IAB allocation). If the IAB is full, the IAB is forwarded to enterprise environment 200 in step 460 (and the dialog has no associated IAB (e.g., Current_IAB is now "false")). If the IAB is not full, or if the IAB has just been forwarded to enterprise environment 200, a check is made if all received data in the receive buffer has been transferred in step 465. If all the received data has not been transferred, execution proceeds to step 450, of FIG. 20, where a new IAB is created, to which data is added in step 445, etc. This sequence (creating IABs, filling them up with data, sending them to enterprise environment 200, etc.) is repeated until all received data has been transferred from the receive buffer. It should be noted that, based on the suggested maximum size of IABs, the sequence should allocate at most one IAB.

Figure 23:
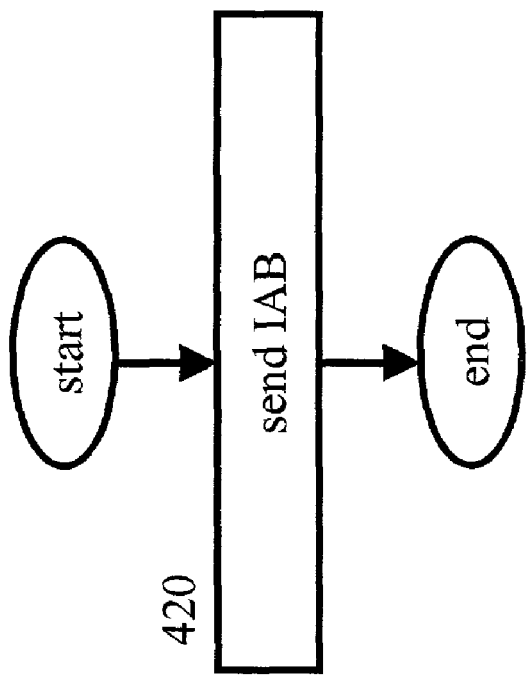

Once all received data has been transferred, execution proceeds to step 470 of FIG. 22, where a check is made if an IAB still exists (but is not full of received data). If an IAB does not exist, then execution ends until more data is received from the remote endpoint for this dialog. However, if a partially full IAB does exist, then execution proceeds to step 475, which checks if other criteria (described below) are met to determine if the partially full IAB should be forwarded at this point to enterprise environment 200, or if ODP element 220 should wait till more data is subsequently received from the remote endpoint. If it is determined that the other criteria are met, the IAB is forwarded to enterprise environment 200 in step 480 (and the dialog has no current IAB). Otherwise, the partially full IAB is not forwarded, and a check is made in step 485 to determine if a timer (IA_Timer) is running for this IAB. If IA_Timer is not running, one is started in step 490. Otherwise, execution ends and awaits the arrival of additional data from the remote endpoint. (When IA_Timer expires, the IAB is forwarded. This time-out is illustrated in step 420 of FIG. 23. In addition, the MRWU of the dialog and/or input accumulation timer time-out period may be adjusted at this point (described below).) It should be noted that whenever an IAB is forwarded to enterprise environment 200, the associated IA_Timer is canceled if it is currently running.

In terms of the above-mentioned "other criteria" of step 475, satisfaction of any of the following conditions will result in ODP element 220 forwarding the IAB to enterprise environment 200.

If the IAB contains out-of-band data from the remote endpoint. (Out-of-band data is, e.g., data representing signaling, control, or status information.)

If the amount of data in the IAB is equal to or greater than the MRWU of the dialog when the current data was received from the remote endpoint (i.e., not the MRWU value resulting from a possible subsequent adjustment due to receiving the data from the remote endpoint).

If the TWO_MTU_ACK_REQUIRED parameter is set (see above) and the IAB contains at least two input (received) packets (frames).

If, based on values of the Total_IABs and Total_Outputs statistics for this dialog, the dialog is determined to be "transaction-oriented" and the current amount of received data contains less than a full message transfer unit (MTU) of data (e.g., for a LAN, less than a LAN segment).

Finally, in terms of exception handling, when an action is taken, or an event occurs, such that it is not valid for the connection to receive additional data, the IAB for that dialog is forwarded immediately to the application. Examples of such occurrences are:

Receipt of an (in-order) FIN message from the remote endpoint.

Receipt of a RESET message from the remote endpoint.

Processing of an abortive disconnect request from the local application.

With respect to the above-mentioned MRWU and step 435 of FIG. 20, values for the MRWU are preferably selected to maximize the size of an IAB. Unfortunately, one side effect of this approach is that the sending protocol stack (e.g., in the remote endpoint) will often run out of window for sending data, thus introducing periods in which no data transfer occurs. As such, it may be beneficial, e.g., to limit the size of an IAB to one-half of the MRWU in order to keep data transfer active. (It should be noted that the MRWU cannot simply be equated to the normal protocol receive window size granted by the local protocol stack to the remote protocol stack. This is due to the fact that the remote protocol stack may have additional criteria limiting the amount of data it will send before waiting for an acknowledgement. For example, the remote protocol stack may limit the amount of data accepted for the remote application in order to limit its usage of available output buffers.)

Illustratively, the MRWU value is initialized to one when a connection is created. This is the lower limit of the MRWU value; the upper limit is the maximum receive window size used by the local protocol stack (which is determined at connection setup as known in the art). Preferably, all updates to the MRWU value are done such that the effect of any given incremental change (sample) is smoothed, i.e., such that any individual sample value does not dramatically affect the original MRWU value. The value of each MRWU for a dialog is maintained independently by ODP element 220 as follows.

When data is received from the remote endpoint, if the current amount of unacknowledged data is greater than the current MRWU value, the MRWU value is adjusted (upward) with a sample equal to the current amount of unacknowledged received data.

When an IAB is forwarded because the input accumulation timer has expired, the MRWU value is adjusted (downward) with a sample equal to a fraction of the current MRWU value. The fraction can be selected to allow either fast or slow MRWU adjustment (determined empirically).

Turning now to the input accumulation timer, this is used to ensure that pending received data is not delayed indefinitely. While the above-described input accumulation process, as a whole, attempts to limit timeout occurrences, some amount of timeouts are inevitable for many types of dialogs. Ideally, a value for the timeout period is selected such that an IAB is not forwarded unnecessarily early (i.e., when more to-be-received data could have been included in order to reach the optimal IAB size). Additionally, since any timeouts that do occur may introduce unnecessary delays in data transfer, it is also desirable to limit these delays by limiting the timeout period value.

As with the MRWU, the illustrative implementation attempts to adjust the IA_Timer timeout period so as to maximize the size of an IAB. As such, other implementations may modify the timeout period adjustment logic for alternative effects. The IA_Timeout_Value for each dialog is maintained independently as follows (note that all adjustments ensure that the new value is limited by the MIN_ACCUM_TIMEOUT and MAX_ACCUM_TIMEOUT parameters described earlier):

IA_Timeout_Value is initially set to the system-wide MIN_ACCUM_TIMEOUT.

When an IAB is forwarded because the IA_Timer expired and the data contained within the IAB fits within the limits of the current MRWU value, the IA_Timeout_Value is adjusted upward by a small (relative to the current value) amount which should be determined empirically—one-quarter of a millisecond is a suggested value.

When an IAB is forwarded because it is full, or because it contains MRWU bytes of data, the IA_Timeout_Value is adjusted downward by a fraction of the difference between the actual "life-time" of the IAB and the current timeout value. The IAB "life-time" refers to the time elapsed between creation of the IAB and when the IAB is forwarded. Illustrative, this fractional value is one-quarter.

IP Routing

Figure 24:
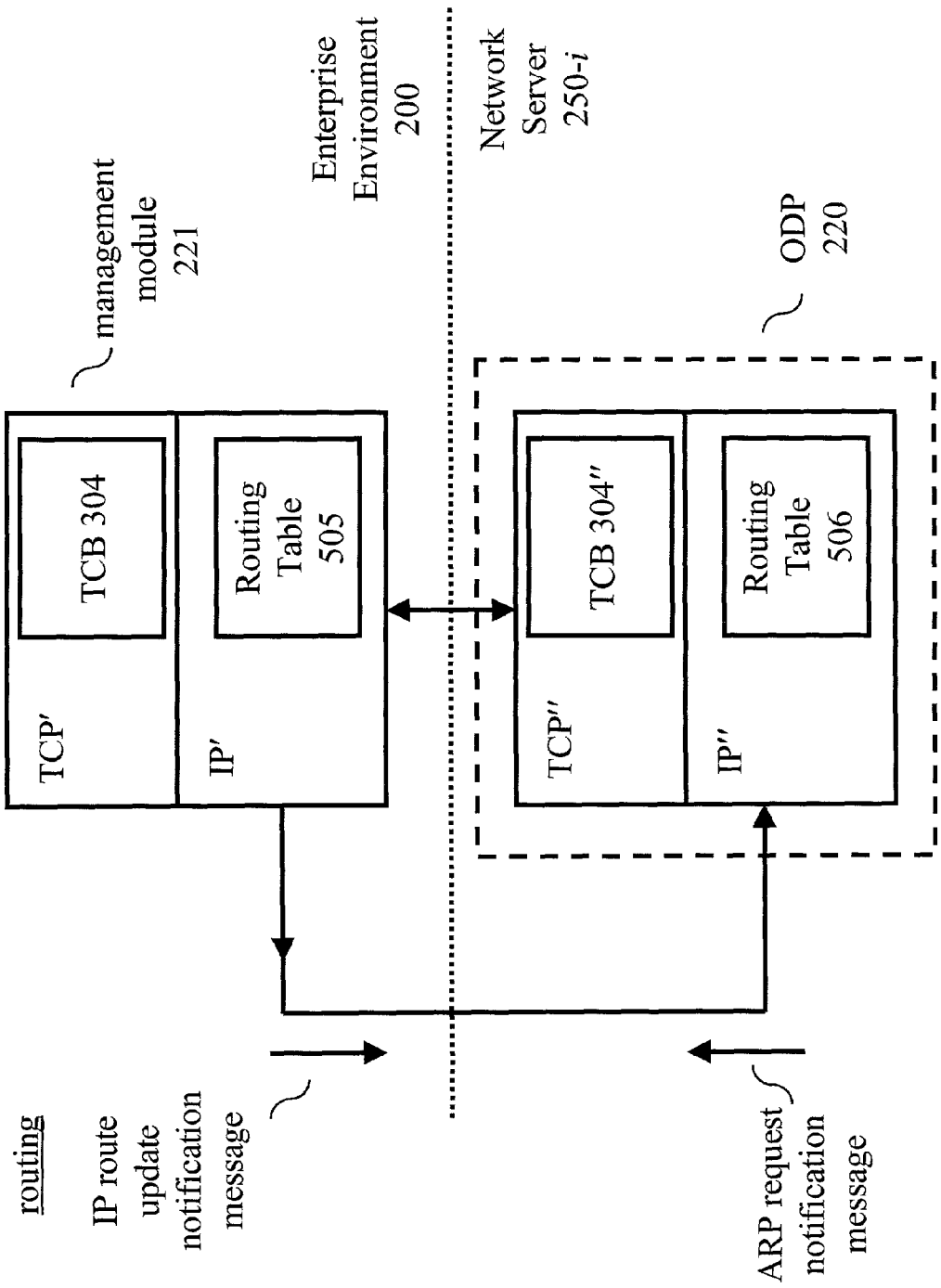
FIGS. 24-25 illustrate routing updates for an off-loaded dialog.

As described above, and referring briefly back to FIG. 7, the ODP requires some IP processing be performed in enterprise environment 200 as indicated by IP' of FIG. 7. A portion of FIG. 7 is redrawn in FIG. 24. In particular, IP' maintains a routing table 505 for storing routing information to various remote endpoints. (Routing information in routing table 505 is collected by using one, or more, of a number of existing techniques, e.g., the "route information protocol" (RIP), the "address resolution protocol" (ARP), the Internet Control Message Protocol (ICMP), etc.) When TCP' of management module 221 requests to open a connection/dialog to a remote endpoint, IP' accesses routing table 505 as a function of the destination IP address associated with the remote endpoint to determine the route to use in sending packets to the remote endpoint. Upon finding route information, this information is provided to TCP' for inclusion in the above-described TCB 304. (Including the routing information in TCB 304 eliminates the necessity of re-determining the route for each and every packet subsequently transmitted after the dialog is established.) This routing information (a part of the above-mentioned "other routing information" 307 of TCB 304) may include physical device information (e.g., a media access control (MAC) address). In addition, routing table 505 also includes the above-mentioned networking information available within HMP 60 as to which network servers/devices can be used to connect to particular IP addresses. Changes to routing information are detected in any number of ways, e.g., via the above-mentioned RIP. After a dialog is established using a particular network interface, if this interface becomes unavailable, the dialog can continue on a different network interface in the same network server. This condition requires an IP route update notification message to be sent to the affected ODP element 220 of HMP 60 as indicated in FIG. 24. When a change is detected, suitable modifications (changes, deletions, additions) are made to routing table 505. Since the routing function of the IP layer is performed in enterprise environment 200, the associated TCB information of a particular dialog must be provided to ODP element 220 of a network server in order to correctly build the packets for transmission. As described above, this TCB information is initially provided during an open via the open endpoint message (or open endpoint recover message) to ODP element 220. This is illustrated in FIG. 24, via TCB 304" within TCP"'. It should be noted enterprise server 200 only delivers dialog-specific routing information to that network server 250-i hosting that dialog. As such, enterprise server 200 is the manager of routing information for many dialogs that may be split over several servers.

Figure 25:
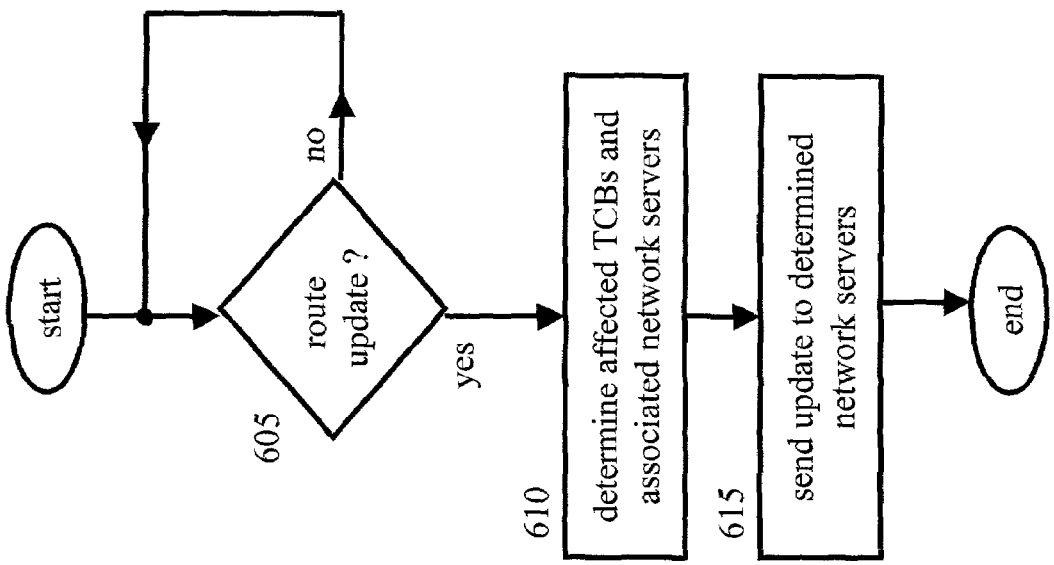

Although a particular route to a remote endpoint typically stays the same during the life of the dialog, it may be the case that a routing change is detected (as noted above) by IP'. In this case, IP' must update the affected routing information by sending an "IP route update notification message" to each affected ODP element 220 of HMP 60 as indicated in FIG. 24. As shown in FIG. 24, IP''' maintains its own routing table 506. A corresponding method for performing a route update is shown in FIG. 25. In step 605, if IP' detects a route change/update, IP' determines, in step 610, the affected TCBs and network servers 250-i (e.g., by examining routing information tables stored within IP' (not shown)). In step 615, IP' sends the route update to the affected network servers 250-i. It should be noted that one route update notification message is sent for each affected destination IP address. As such, multiple dialogs (TCBs) to the same destination IP address have their routing information updated at the same time via one route update notification message.

In terms of routing information, ARP is used to resolve the next hop physical (or MAC) address associated with a remote IP address. If a route is not available an error is returned to the TCP' module. If a route is available but the next hop physical address is unknown, the routing information is passed from IP' to IP''' with a null next hop physical address and IP' invokes ARP to broadcast an ARP Request message to the network. The route information is also returned to the TCP' module and processing continues. If data is sent on a dialog associated with a route that has a null next hop physical address, "P" queues the data in network server 250-i and issues an ARP Request Notification message (e.g., see FIG. 24) to IP' to invoke ARP processing. IP' maintains tables (not shown) that allow it to know what ARP Requests are currently outstanding for various network servers and issues a broadcast ARP Request message as needed. When the ARP Reply message is received by IP', it issues a new IP Route Update Notification message indicating that the route has been updated and including the next hop physical address received in the ARP Reply message. Upon receipt of the IP Route Update Notification message, IP''' sends any queued data associated with that route. If the ARP Reply is not received within the ARP retry limit, IP' issues an IP Route Update Notification message indicating that the route should "discard" any queued data. Upon receipt of this notification, IP''' purges any queued data on the route and new data sent on the route will again be queued.

A similar technique is used when TCP''' notifies IP''' of "Negative Advice," that is when a dialog using a particular route has retransmitted passed its threshold. IP''' issues a Negative Advice notification message to IP' to invoke status checking on the current route. IP' uses ICMP to determine if the current route is still alive. If the route is still alive, an IP' route update notification message is issued to IP''' with no new information, signifying that the current route is still alive. Otherwise, if IP' discovers the current route to be dead, IP' performs a new route lookup and sends an IP' route update notification message with the new information if available.

Accumulated Acknowledgements

As can be observed from FIGS. 13 and 14, there is a flow of ACK messages with respect to both the outgoing and incoming data streams for a single dialog. However, there may be hundreds (if not thousands) of dialogs running on enterprise environment 200. In this context, enterprise environment 200 will spend time processing individual ACK messages for incoming and outgoing data. For example, if 15 ACK messages (associated with 10 different dialogs) are received by ODP element 220 from remote peers, then management module 221 must individually process each of these 15 ACK messages. Therefore, and as described below, a "Many ACK" message is created for accumulating individual ACK messages whereby processing overhead in enterprise environment 200 may be significantly reduced. (It should also be observed that use of a "Many ACK" message may cause significant performance improvement due to the reduction in messaging that will occur between enterprise environment 200 and a network server 250-i.) Continuing with the above example, a "Many ACK" message incorporates the accumulated ACK messages for the 10 dialogs—thus requiring management module 221 to only process 1 ACK message—not 15. In other words, a single ACK message is now representative of several ACK messages received for each dialog listed in the single ACK message.

Figure 26:
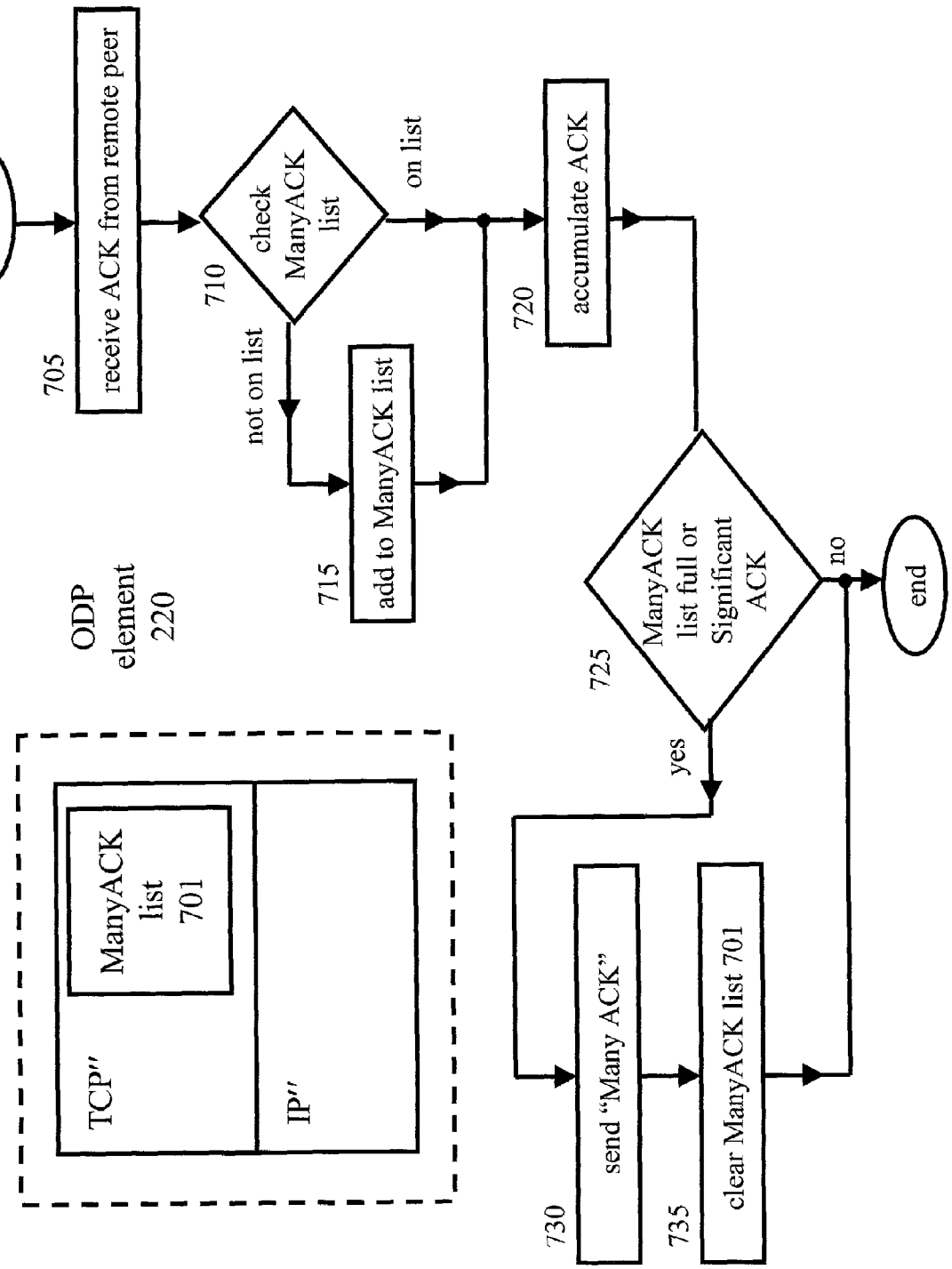

An illustrative flow chart for use in providing a "Many ACK" message with respect to previously sent (i.e., outgoing) data packets to a remote peer is shown in FIG. 26. ODP element 220 maintains a Many ACK list 701 (this is initially cleared). Many ACK list 701 identifies individual dialogs (e.g., using the source IP address, destination IP address, source TCP port and destination TCP port from the received ACK) and, for each identified dialog, the current accumulated acknowledgement information for data previously sent by HMP 60. In step 705, ODP element 220 receives an ACK message from the remote peer, the ACK message identifying the dialog and acknowledging data received by the remote peer. In step 710, ODP element 220 checks if the identified dialog is on ManyACK list 701 (e.g., by scanning the stored information in ManyACK list 701). If the identified dialog is not on the list, ODP element 220 adds the dialog to ManyACK list 701 in step 715. In either event, ODP element 220 then saves the acknowledgment information found in the received ACK as the most update acknowledgement in step 720. In step 725, ODP element 220 checks to see if ManyACK list 701 is full, i.e., has reached a predefined number of dialogs, e.g., 10 dialogs. If ManyACK list 701 is not full, execution ends till the next received ACK message. However, if ManyACK list 701 is full, then ODP element 220 sends to, or exchanges with, management module 221 a "ManyACK" message in step 730. As determined from ManyACK list 701, the "ManyACK" message lists each dialog and the current amount of data acknowledged for that dialog by the remote peer. In step 735, ODP element 220 clears Many ACK list 701. It should also be noted in step 725, that a "Many ACK" message is sent if a "significant ACK" is received from a remote peer for one of the dialogs indicated in ManyACK list 701. A "significant ACK" may typically be defined so as to allow the continuous flow of data from the enterprise environment to the network server.

Figure 27:
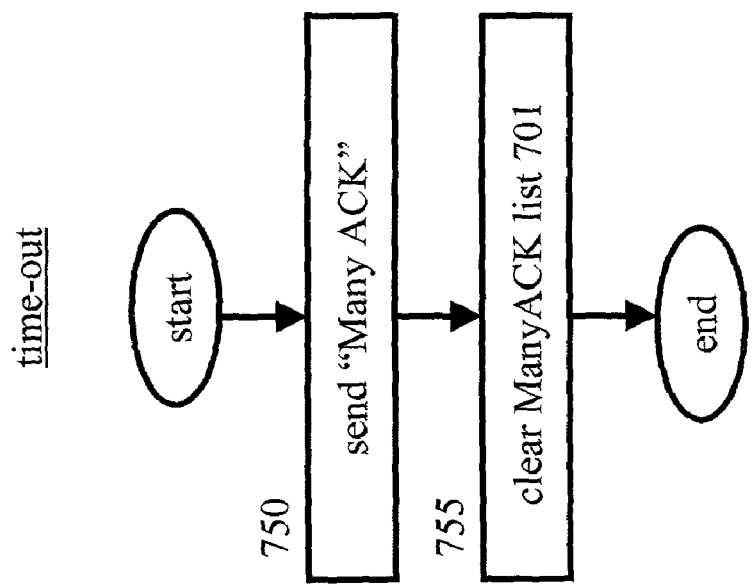

Although ODP element 220 can continue to accumulate acknowledgement information until ManyACK list 701 is full, time delays should also be considered—i.e., management module 221 should not have to wait too long before receiving acknowledgements being held up by ODP element 220. These data acknowledgements affect the status of any transmission windows and may cause management module 221 to issue a "not ready" message to a particular dialog (as illustrated in FIG. 13). In this context, the flow chart of FIG. 27 illustrates a time-out mechanism. An illustrative value for this timer is 5 seconds. When the time-out occurs, ODP element 220 executes steps 750 and 755 as shown. Thus, management module 221 receives a "Many ACK" message either when ManyACK list 701 is full, a significant acknowledgement is received for a dialog or upon the occurrence of a time-out. (It should be noted that when the timer expiration occurs, all the dialogs in ManyACK list 701 are not necessarily sent up to enterprise environment 200. In particular, only those dialogs that have been on the list for the timeout interval are sent. So, if a dialog was just newly added to Many ACK list 701 and the timer expires, that dialog is not included.)

Figure 28:
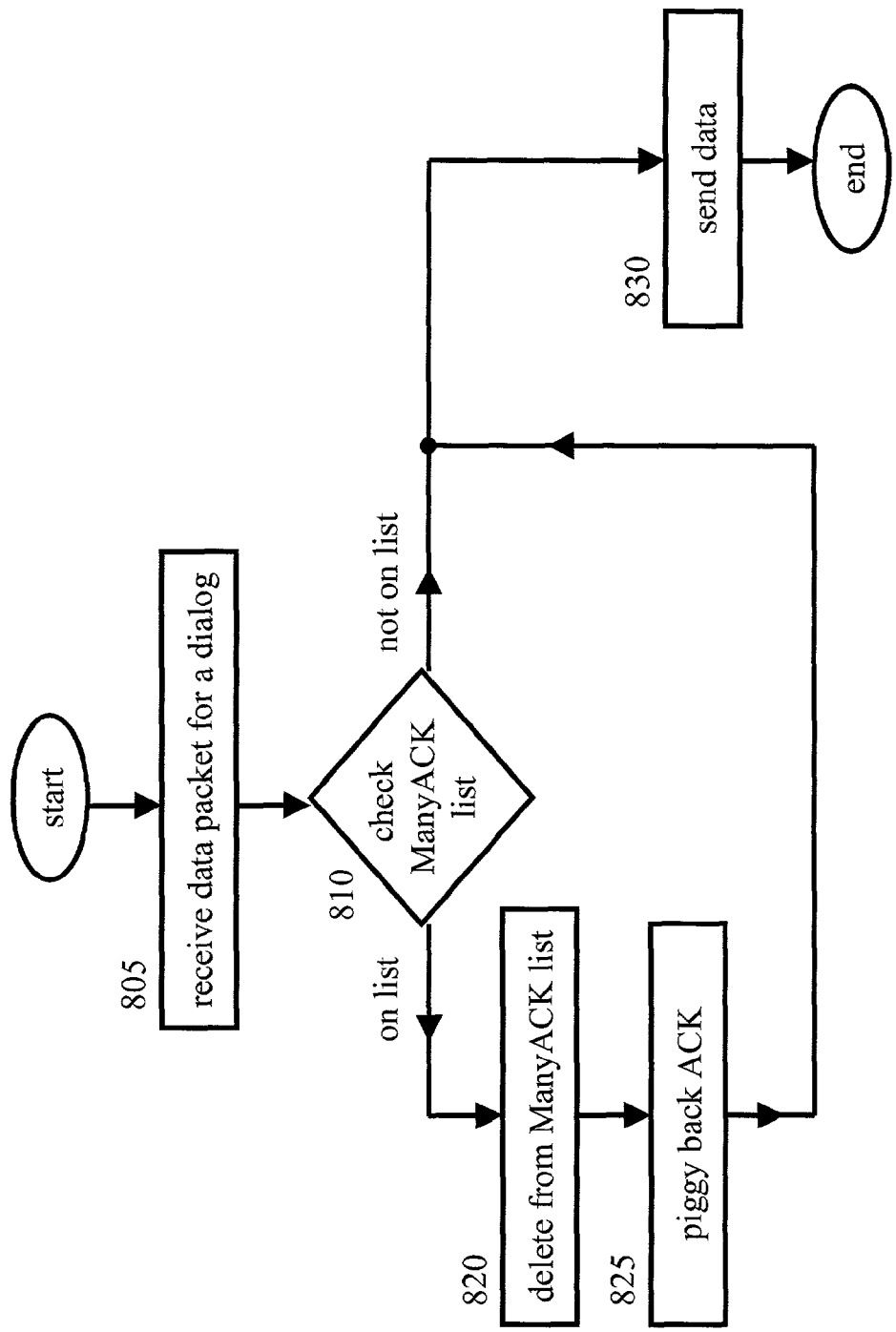

As noted above, the general principle for a "Many ACK" message is to bundle together numerous single ACK messages into one, thereby reducing the message processing overhead incurred by management module 221 in enterprise environment 200. However, it may be the case that a dialog between a local application in enterprise environment 200 and a remote application is transactional in nature, i.e., not only is data being sent from the local application to the remote peer (which then provides the above-described ACK messages), but the remote peer is also sending data to the local application. In this case, a data packet is provided to management module 221 (it should be noted that input accumulation may also occur as described above). Since management module 221 must process the data packet (whether it contains accumulated data or not)—any accumulated acknowledgements for that dialog are "piggy-backed" into the data packet at that time. An illustrative flow chart is shown in FIG. 28. In step 805, ODP element 220 receives a data packet for a particular dialog (as indicated by the respective IP source and destination addresses). In step 810, ODP element 220 checks if this particular dialog is already listed on ManyACK list 701. If this particular dialog is not listed in ManyACK list 701, ODP element 220 sends data to management module 221 in step 830. (As noted above, input accumulation may occur, in which case the data packet sent in step 830 represents the accumulation of data from one or more received packets.) It should be noted that if any acknowledgement information is already contained within a received packet—this is merely forwarded to management module 221 in step 830 (with suitable modifications, if necessary, in the case of an accumulated data packet (as described above)). However, if this particular dialog is listed on ManyACK list 701, then, in step 820, ODP element 220 deletes this particular dialog from ManyACK list 701. In step 825, ODP element 220 piggy-backs the accumulated acknowledgement information into the data packet, which is sent to management module 221 in step 830. (It should be noted that since data is being received from the remote endpoint, this flow chart may be modified to support the DWACK processing described below.)

The description above dealt with acknowledgements of data, where the data was sent by HMP 60 to the remote peer. It has been observed that implementation of the Many ACK mechanism for data sent by remote peers introduces processing overhead in the enterprise environment. This overhead is related mainly to the necessity to implement exclusive access (e.g., via an operating system provided locking mechanism) to Many ACK related information (e.g. the ManyAck list) at several execution points in processing both input and output data. In addition to executing the exclusive access mechanisms, delays may be introduced as Many ACK related processing for one dialog must wait for Many ACK related processing for another dialog to complete. Thus, an alternate method for utilizing the Many ACK mechanism for data sent by remote peers is illustratively shown in FIGS. 29-32.

Figure 29:
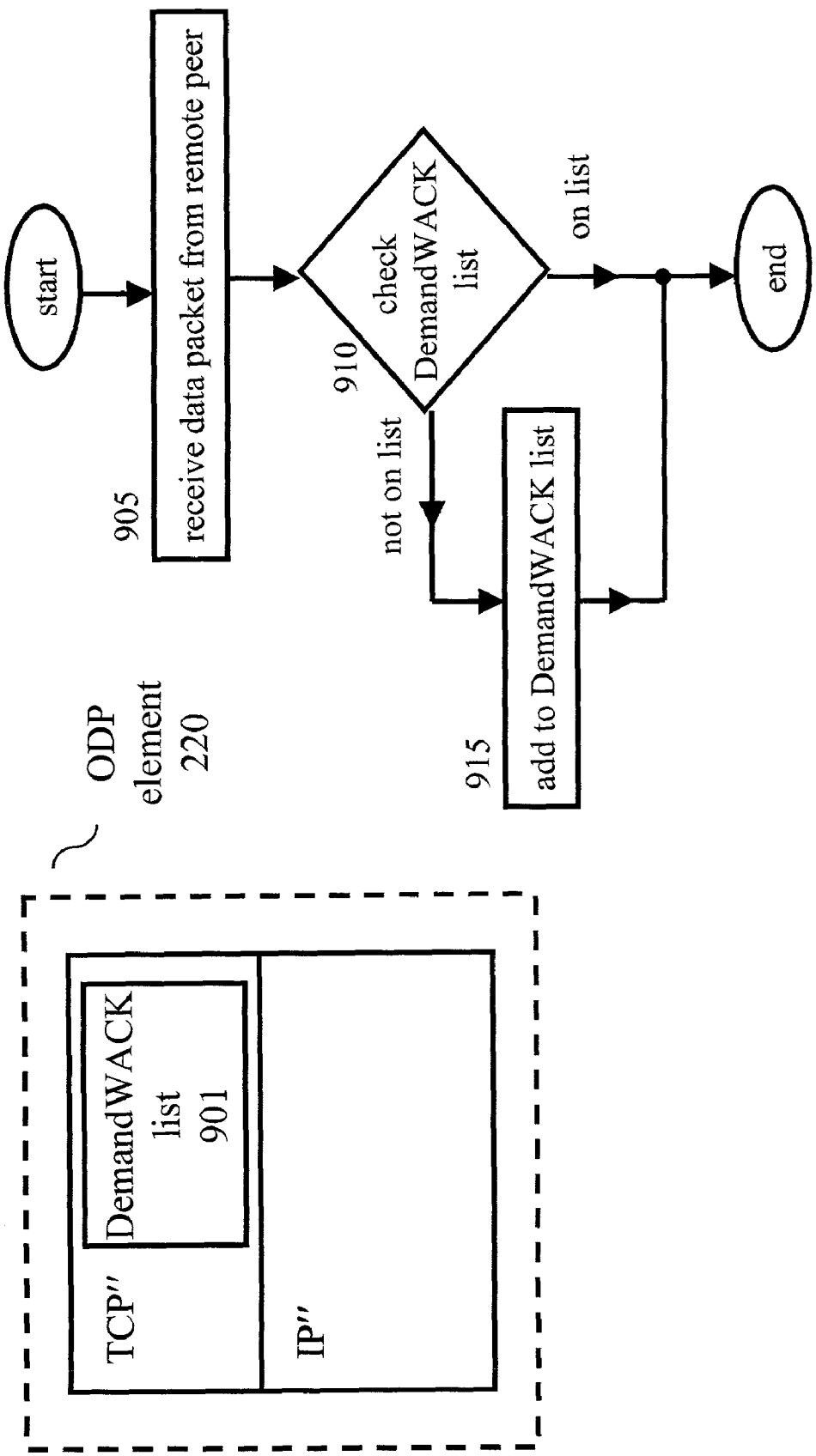
Figure 30:
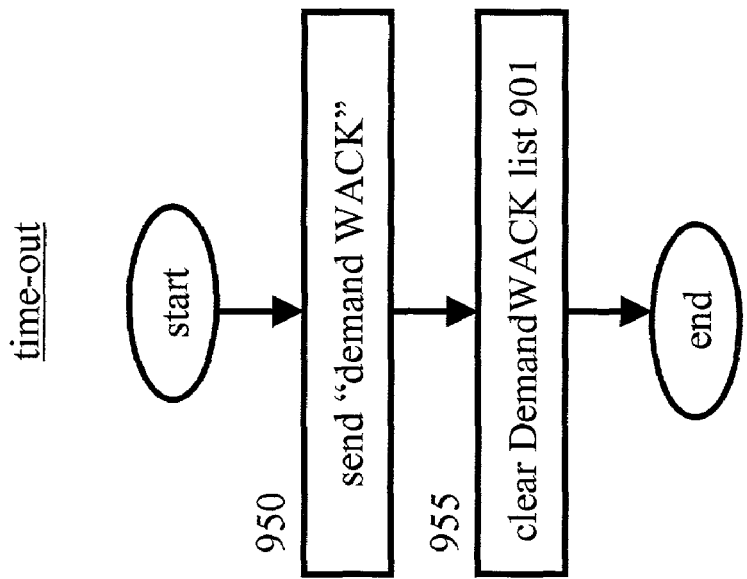

Turning first to FIG. 29, in step 905, ODP element 220 receives a data packet—associated with a particular dialog—from a remote peer. In step 910, ODP element 220 checks DemandWACK list 901 to determine if this particular dialog already has un-acknowledged data associated with it. (DemandWACK list 901 comprises those dialogs for which there is data received from the remote peer and not yet acknowledged by enterprise environment 200.) If this particular dialog is not currently on the list, ODP element 220 adds the dialog to the list in step 915. In any event, the received data is pushed on to management module 221 for storage in a corresponding receive window (buffer) associated with the particular dialog. (As noted above, data packets may first be subject to "input accumulation," as described above, before being sent to enterprise environment 200.)

If the remote peer does not receive an acknowledgment to previously transmitted data within a predefined period of time, T seconds, the remote peer will re-send the data. Consequently, ODP element 220 implements a time-out mechanism to attempt to ensure that an acknowledgement is sent in a timely fashion to the remote peer. For example, every t seconds (where t<T) a time-out occurs (e.g., t=0.1 milliseconds) and ODP element 220 performs steps 950 and 955 shown in FIG. 30. In step 950, ODP element 220 sends a "demand Window Acknowledgment" (Demand WACK) message to management module 221, where the "Demand WACK" message requests an acknowledgement for any un- ACKed data as indicated in DemandWACK list 901. In step 955, ODP element 220 clears DemandWACK list 901. (Since ODP element 220 is providing a mechanism to prompt management module 221 for acknowledgements, this frees up processing overhead in enterprise environment 200 since individual acknowledgements do not have to be asynchronously processed. In addition, this eliminates the need to use an ACK timer, for each dialog, in the enterprise environment (since the network server prompts the enterprise environment when to ack) and, in this case, the network server ACK timer is one timer encompassing all dialogs (not one for each dialog.))

Turning now to FIG. 31, enterprise environment 200 receives the "Demand WACK" message in step 965. Enterprise environment 200 then provides, in step 970, a "Many ACK" message to ODP element 220, where the "Many ACK" message comprises ACKs for each dialog indicated in the "Demand WACK" message. In step 980, ODP element 220 of the network server receives the "Many ACK" message and, in step 985, provides individual ACK messages to the corresponding remote peers for the dialogs indicted in the "Many ACK" message.

Figure 32:
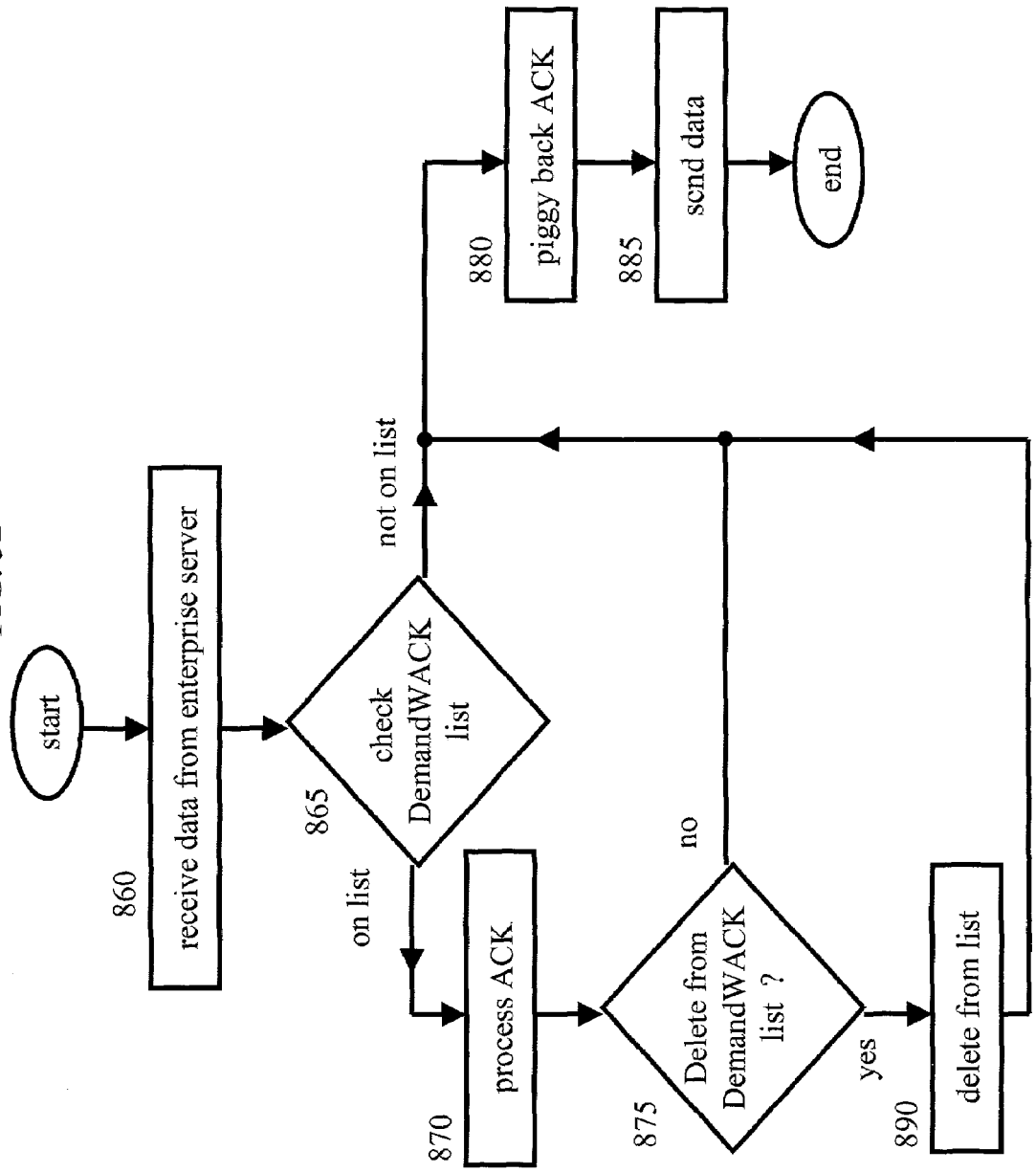

In a similar fashion to that described for incoming data packets, enterprise environment 200 may take advantage of data that it is sending to a remote peer for piggy-backing acknowledgement information at that time—instead of waiting to received a "Demand WACK" message. An illustrative flow chart for use in a ODP element 220 is shown in FIG. 32. In step 860, ODP element 220 receives data from management module 221 for transmission to a remote peer, where the data includes acknowledgement information. In step 865, ODP element 220 checks if the received acknowledgement corresponds to a dialog currently on DemandWACK list 901. If this dialog is on DemandWACK list 901, then ODP element 220 processes the acknowledgement in step 870. In step 875, ODP element 220 determines if the dialog should be deleted from DemandWACK list 901. The dialog is deleted, in step 890, if the acknowledgement acknowledges all of the data and there is a full window. Whether the dialog is deleted, or not, from DemandWACK list 901, or if the dialog was not on DemandWACK list 901, the acknowledgment is piggybacked in step 880 and sent along with data to the remote peer in step 885.

It should be noted that a TCP ACK includes both acknowledgement information and window size update information. As such, the description above with respect to accumulation, or bundling, of acknowledgements can be extended in a straightforward manner to include accumulation, or bundling, of window size updates.

The foregoing merely illustrates the principles of the invention and it will thus be appreciated that those skilled in the art will be able to devise numerous alternative arrangements which, although not explicitly described herein, embody the principles of the invention and are within its spirit and scope. For example, although illustrated in the context of physically separate heterogeneous environments, one environment may be emulated in the other, e.g., the enterprise environment may be emulated in software in an NT box. Further, the inventive concept is independent of the operating system of both computing environments and/or the computing environments can be of the same type. For example, both the enterprise system and the network server may be Windows boxes. In addition, although the invention was illustrated in the context of TCP/IP, the inventive concept is applicable to other transport and network protocols.

What is claimed:

1. A distributed computer system for use in establishing a dialog from a local application to a remote application, the distributed computer system comprising:
   an enterprise server; and
   at least one network server;
   wherein the dialog is established using the network server;
   the at least one network servers maintain a ManyACK list containing an entry for each dialog exchanging acknowledgement messages between the enterprise server and the remote application;
   the at least one network server update the entry in the ManyACK list corresponding to the particular dialog associated with each acknowledgement message indicating receipt of one acknowledgement message;
   the at least one network servers forward a ManyACK message to the enterprise server indicating receipt of a set of acknowledgement messages when the entry in the ManyACK list corresponding to the particular dialog associated with the acknowledgement message indicates a predetermined number of acknowledgement messages have been received for the particular dialog and
   the enterprise server performs dialog recovery by moving the dialog from the network server upon the occurrence of a predefined condition;
   wherein the ManyACK message is transmitted in place of an acknowledgement message in response to each message sent in the dialog.

2. The distributed computer system of claim 1 wherein the dialog is established using distributed transmission control protocol (TCP) communications.

3. The distributed computer system of claim 1 wherein the dialog is established using a transmission control protocol/internet protocol (TCP/IP) such that management-related function are substantially performed in the enterprise server while the data-related functions are substantially performed in the respective at least one network server.

4. The distributed computer system of claim 1 wherein the dialog is established by passing information from a transmission control protocol (TCP) control block stored in the enterprise server to the at least one network server.

5. The distributed computer system of claim 1 wherein the dialog is an off-loaded dialog.

6. The distributed computer system if claim 1 wherein the at least one network server is off-load capable.

7. The distributed computer system of claim 1 wherein the predefined condition is a failure of the at least one network server.

8. The distributed computer system of claim 1 wherein the dialog is moved to a legacy TCP/Internet Protocol (IP) stack of the enterprise server.

9. The distributed computer system of claim 1, wherein the dialog is moved to another one of the at least one network server of the distributed computer system.

10. A method for use in at least one network servers for performing dialog recovery in an application platform, the application platform comprising an enterprise server and the network server, the method comprising the steps of:
    establishing, through the at least one network servers of the application platform, a dialog with a remote endpoint, wherein the at least one network server receives socket information associated with the dialog;
    subsequent to the establishment of the dialog, sending a recover dialog message to another one of the at least one network server of the application platform for recovering the dialog, wherein the recover dialog message comprises the socket information;

receiving, from the enterprise server, a dialog recover message comprising existing socket information identifying an existing dialog; and sending packets to a remote endpoint identified from the existing socket information for recovering the existing dialog;

selecting, in the enterprise server, one of the at least one network servers for recovery of an existing dialog;

moving the existing dialog to the selected one of the at least one network servers; and using the selected one of the at least one network server for the synchronization of data with a remote endpoint of the existing dialog;

wherein the one of the at least one network server:

maintains a ManyACK list containing an entry for each dialog exchanging acknowledgement messages between the enterprise server and the remote application;

updates the entry in the ManyACK list corresponding to the particular dialog associated with each acknowledgement message indicating receipt of one acknowledgement message; and forwards a ManyACK message to the enterprise server indicating receipt of a set of acknowledgement messages when the entry in the ManyACK list corresponding to the particular dialog associated with the acknowledgement message indicates a predetermined number of acknowledgement messages have been received for the particular dialog;

wherein the ManyACK message is transmitted in place of an acknowledgement message in response to each message sent in the dialog.

11. The method of claim 10 wherein the dialog is established using distributed transmission control protocol (TCP) communications.

12. The method of claim 11 wherein the dialog is established using a transmission control protocol/internet protocol (TCP/IP) such that management-related function are substantially performed in the enterprise server while the data-related functions are substantially performed in the respective network server.

13. The method of claim 12, wherein the moving step includes the step of sending a recover dialog message to the selected network server, wherein the recover dialog message comprises socket information for the existing dialog.

14. The method of claim 12 wherein the dialog is an off-loaded dialog.

15. The method of claim 12, wherein the moving step includes the step of sending a recover dialog message to another network server, wherein the recover dialog message comprises socket information for the existing dialog.

16. The method of claim 12, further comprising the step of subsequent to moving the existing dialog, synchronizing data with a remote endpoint of the existing dialog.

17. The method of claim 12 wherein the predefined condition is a failure of the network server.

18. The method of claim 12 wherein the moving step includes the step of moving the dialog to a legacy TCP/Internet Protocol (IP) stack of the enterprise server.

19. A machine readable storage medium storing a computer program product, readable by at least one machine, embodying a program of instructions executable by the at least one machine for performing a method for use in dialog recover, the method comprising the steps of:

establishing, trough the at least one network servers of the application platform, a dialog with a remote endpoint, wherein the at least one network server receives socket information associated with the dialog;

subsequent to the establishment of the dialog, sending a recover dialog message to another one of the at least one network server of the application platform for recovering the dialog, wherein the recover dialog message comprises the socket information;

receiving, from the enterprise server, a dialog recover message comprising existing socket information identifying an existing dialog; and sending packets to a remote endpoint identified from the existing socket information for recovering the existing dialog;

selecting, in the enterprise server, one of the at least one network servers for recovery of an existing dialog;

moving the existing dialog to the selected one of the at least one network servers; and using the selected one of the at least one network server for the synchronization of data with a remote endpoint of the existing dialog;

wherein the one of the at least one network server:

maintains a ManyACK list containing an entry for each dialog exchanging acknowledgement messages between the enterprise server and the remote application;

updates the entry in the ManyACK list corresponding to the particular dialog associated with each acknowledgement message indicating receipt of one acknowledgement message; and forwards a ManyACK message to the enterprise server indicating receipt of a set of acknowledgement messages when the entry in the ManyACK list corresponding to the particular dialog associated with the acknowledgement message indicates a predetermined number of acknowledgement messages have been received for the particular dialog.

20. The computer program product of claim 19, wherein the moving step includes the step of sending a recover dialog message to another network server, wherein the recover dialog message comprises socket information for the existing dialog.

21. The computer program of claim 19, further comprising the step of subsequent to moving the existing dialog, synchronizing data with a remote endpoint of the existing dialog.

22. The computer program product of claim 19, wherein the dialog is an off-loaded dialog.

23. The computer program product of claim 19, wherein the predefined condition is a failure of the at least one network server.

24. The computer program product of claim 19 wherein the moving step includes the step of moving the dialog to a legacy TCP/Internet Protocol (IP) stack of the enterprise server.

* * * * *